United States Patent
Imagawa et al.

(10) Patent No.: US 12,283,069 B2
(45) Date of Patent: Apr. 22, 2025

(54) CONVERSION PARAMETER CALCULATION METHOD, DISPLACEMENT AMOUNT CALCULATION METHOD, CONVERSION PARAMETER CALCULATION DEVICE, AND DISPLACEMENT AMOUNT CALCULATION DEVICE

(71) Applicant: Panasonic Intellectual Property Management Co., Ltd., Osaka (JP)

(72) Inventors: Taro Imagawa, Osaka (JP); Akihiro Noda, Osaka (JP); Yuki Maruyama, Osaka (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 515 days.

(21) Appl. No.: 17/704,290

(22) Filed: Mar. 25, 2022

(65) Prior Publication Data
US 2022/0215582 A1    Jul. 7, 2022

Related U.S. Application Data

(63) Continuation of application No. PCT/JP2020/023535, filed on Jun. 16, 2020.

(30) Foreign Application Priority Data

Oct. 10, 2019    (JP) .................................. 2019-186791

(51) Int. Cl.
*G06K 9/00*    (2022.01)
*A61K 35/12*    (2015.01)
(Continued)

(52) U.S. Cl.
CPC ................ *G06T 7/74* (2017.01); *G06V 10/98* (2022.01)

(58) Field of Classification Search
CPC . G06K 9/00; H04N 23/75; G01P 3/38; A61K 35/12
(Continued)

(56) References Cited

U.S. PATENT DOCUMENTS

| 6,675,121 B1 * | 1/2004 | Hardin ...................... G01P 3/38 356/28 |
| 2013/0010084 A1 * | 1/2013 | Hatano ................ H04N 13/246 348/47 |

(Continued)

FOREIGN PATENT DOCUMENTS

| JP | 2007-171092 | 7/2007 |
| JP | 5281610 | 9/2013 |

(Continued)

OTHER PUBLICATIONS

International Search Report issued Aug. 25, 2020 in International (PCT) Application No. PCT/JP2020/023535.

*Primary Examiner* — Seyed H Azarian
(74) *Attorney, Agent, or Firm* — Wenderoth, Lind & Ponack L.L.P.

(57) ABSTRACT

A conversion parameter calculation method includes: obtaining, from a first image capturing device, first image data obtained by the first image capturing device capturing an image of an object; obtaining, from a second image capturing device, second distance data indicating a distance to the object, and second image data obtained by the second image capturing device capturing an image of the object; obtaining displacement direction information indicating a direction of a displacement of the object in three dimensions; associating positions on the object in the first image data and the second image data; estimating a position of the (Continued)

first image capturing device; calculating first distance data indicating a distance from the first image capturing device to the object; and calculating a conversion parameter for converting a pixel displacement amount of the object into the actual displacement amount, using the first distance data and the displacement direction information.

11 Claims, 12 Drawing Sheets

(51) Int. Cl.
  *G06T 7/73*   (2017.01)
  *G06V 10/98*   (2022.01)

(58) Field of Classification Search
  USPC ....... 382/100, 103, 106–107, 108, 123, 154, 382/162, 168, 173, 181, 201, 203, 219, 382/254, 276, 285–291, 317; 356/28; 342/171; 348/46, 47
  See application file for complete search history.

(56) References Cited

U.S. PATENT DOCUMENTS

| | | | |
|---|---|---|---|
| 2013/0129148 A1* | 5/2013 | Nanri | G06T 7/174 |
| | | | 382/103 |
| 2014/0146140 A1* | 5/2014 | Shimamoto | H04N 23/75 |
| | | | 348/46 |
| 2016/0377702 A1* | 12/2016 | Yomo | G01S 7/4026 |
| | | | 342/173 |
| 2017/0243366 A1 | 8/2017 | Imagawa | |
| 2018/0017379 A1 | 1/2018 | Nakagawa et al. | |
| 2018/0108145 A1* | 4/2018 | Miura | H04N 13/344 |

FOREIGN PATENT DOCUMENTS

| | | |
|---|---|---|
| JP | 2017-215306 | 12/2017 |
| JP | 2018-67300 | 4/2018 |
| WO | 2016/158855 | 10/2016 |

\* cited by examiner

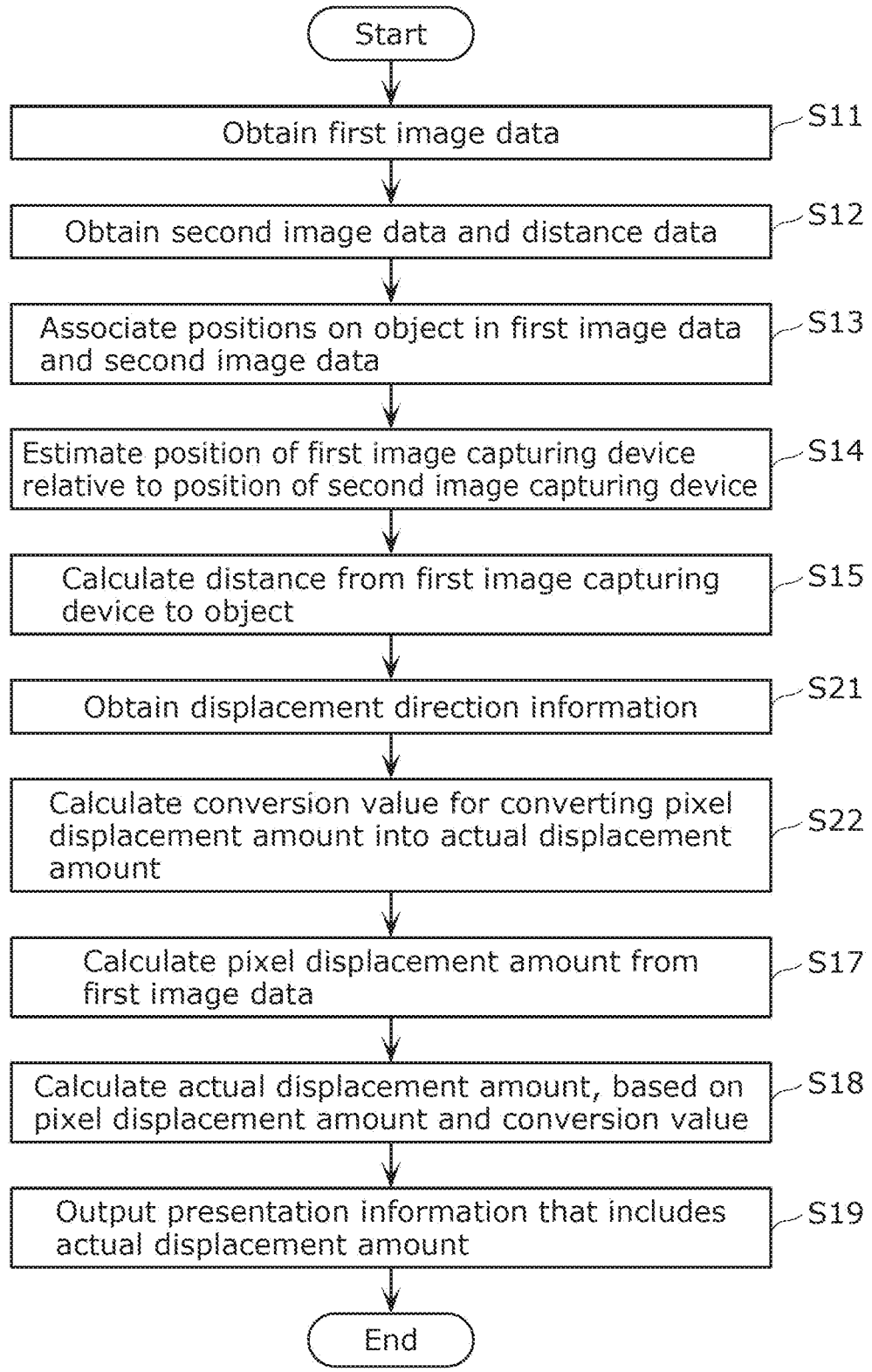

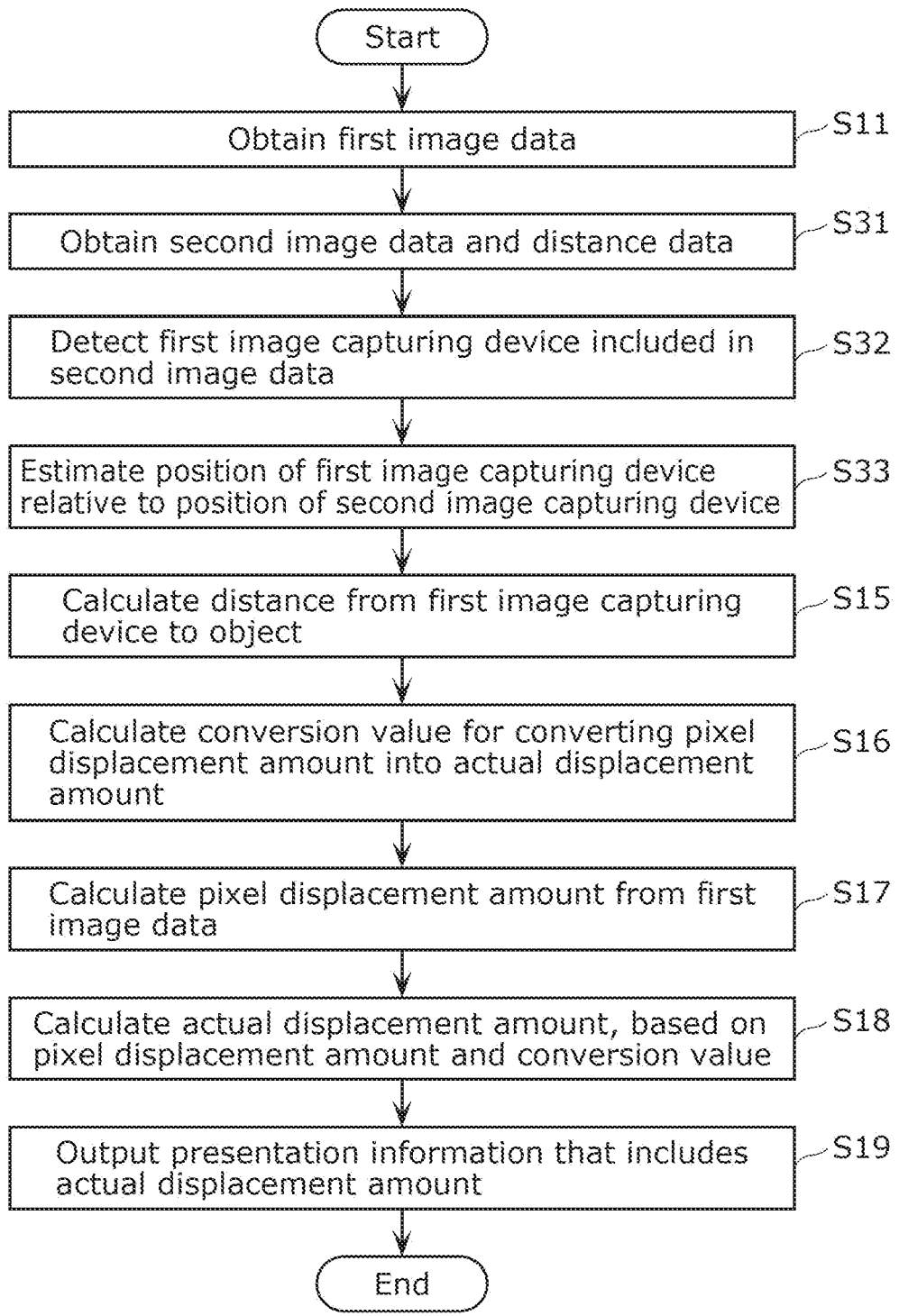

CONVERSION PARAMETER CALCULATION METHOD, DISPLACEMENT AMOUNT CALCULATION METHOD, CONVERSION PARAMETER CALCULATION DEVICE, AND DISPLACEMENT AMOUNT CALCULATION DEVICE

CROSS REFERENCE TO RELATED APPLICATIONS

This is a continuation application of PCT International Application No. PCT/JP2020/023535 filed on Jun. 16, 2020, designating the United States of America, which is based on and claims priority of Japanese Patent Application No. 2019-186791 filed on Oct. 10, 2019. The entire disclosures of the above-identified applications, including the specifications, drawings and claims are incorporated herein by reference in their entirety.

FIELD

The present disclosure relates to a conversion parameter calculation method, a displacement amount calculation method, a conversion parameter calculation device, and a displacement amount calculation device, which are for calculating a conversion parameter for measuring an actual displacement amount that is an actual value of a displacement indicating movement of an object using images.

BACKGROUND

Conventionally, an image capturing device has been disclosed that can measure the state of an object in a contactless manner using image data obtained by capturing an image of an object with a camera and a distance measurement value indicating a distance up to the object, which is obtained by measuring the distance using a distance measurement device such as a laser rangefinder (see Patent Literature (PTL) 1). If the object is a bridge, for example, the state indicates a deformation amount of the bridge, for instance.

CITATION LIST

Patent Literature

PTL 1: Japanese Patent No. 5281610

SUMMARY

Technical Problem

However, the image capturing device according to PTL 1 needs to dispose the camera and the distance measurement device such that the optical axis of the camera and the optical axis of the distance measurement device are parallel to each other in order to accurately measure the state of the object. Accordingly, PTL 1 discloses use of an attaching tool for attaching the camera and the distance measurement device such the optical axis of the camera and the optical axis of the distance measurement device are parallel to each other. In this manner, an attaching tool needs to be provided for the image capturing device according to PTL 1 in order to measure the state of an object accurately, and thus it is difficult to accurately and readily measure the actual value of a displacement.

In view of this, the present disclosure relates to a conversion parameter calculation method and others with which the displacement amount can be accurately and readily converted into an actual value in measuring a displacement using images.

Solution to Problem

A conversion parameter calculation method according to an aspect of the present disclosure is a conversion parameter calculation method for calculating a conversion parameter for measuring, using images, an actual displacement amount that is an actual value of a displacement indicating movement of an object, the conversion parameter calculation method including: obtaining, from a first image capturing device, first image data obtained by the first image capturing device capturing an image of the object; obtaining, from a second image capturing device, second distance data indicating a distance from the second image capturing device to the object, and second image data obtained by the second image capturing device capturing an image of the object, the second image capturing device being disposed in a position different from a position of the first image capturing device; obtaining displacement direction information indicating a direction of the displacement of the object in three dimensions; associating a position on the object in the first image data with a position on the object in the second image data; estimating the position of the first image capturing device relative to the position of the second image capturing device, based on the second distance data and a result of associating the positions; calculating first distance data indicating a distance from the first image capturing device to the object, based on the position of the first image capturing device and the second distance data; and calculating the conversion parameter, using the first distance data and the displacement direction information, the conversion parameter being a parameter for converting, into the actual displacement amount, a pixel displacement amount at a measurement point on the object based on at least two third image data items captured by the first image capturing device at different times.

A conversion parameter calculation method according to an aspect of the present disclosure is a conversion parameter calculation method for calculating a conversion parameter for measuring, using images, an actual displacement amount that is an actual value of a displacement indicating movement of an object, the conversion parameter calculation method including: obtaining, from a first image capturing device, first image data obtained by the first image capturing device capturing an image of the object; obtaining, from a second image capturing device, second distance data indicating a distance from the second image capturing device to the object, and second image data obtained by the second image capturing device capturing an image that includes the object and the first image capturing device, the second image capturing device being disposed in a position different from a position of the first image capturing device; obtaining displacement direction information indicating a direction of the displacement of the object in three dimensions; detecting a shape of the first image capturing device in the second image data; estimating the position of the first image capturing device, based on a result of detecting the shape; calculating first distance data indicating a distance from the first image capturing device to the object, based on the position of the first image capturing device and the second distance data; and calculating the conversion parameter, using the first distance data and the displacement direction information, the conversion parameter being a parameter for converting, into the actual displacement amount, a pixel displacement amount at a measurement point on the object based on at least two third image data items captured by the first image capturing device at different times.

A conversion parameter calculation method according to an aspect of the present disclosure is a conversion parameter calculation method for calculating a conversion parameter for measuring, using images, an actual displacement amount that is an actual value of a displacement indicating movement of an object, the conversion parameter calculation method including: obtaining, from a first image capturing device, first image data obtained by the first image capturing device capturing an image of the object; obtaining, from a second image capturing device, second distance data indicating a distance from the second image capturing device to the object, and second image data obtained by the second image capturing device capturing an image that includes the object and the first image capturing device, the second image capturing device being disposed in a position different from a position of the first image capturing device; obtaining displacement direction information indicating a direction of the displacement of the object in three dimensions; detecting a shape of the first image capturing device in the second image data; estimating the position and an orientation of the first image capturing device, based on a result of detecting the shape; calculating first distance data indicating a distance from the first image capturing device to the object, based on the position and the orientation of the first image capturing device and the second distance data; and calculating the conversion parameter, using the first distance data and the displacement direction information, the conversion parameter being a parameter for converting, into the actual displacement amount, a pixel displacement amount at a measurement point on the object based on at least two third image data items captured by the first image capturing device at different times.

A displacement amount calculation method according to an aspect of the present disclosure includes: obtaining the conversion parameter calculated using the above conversion parameter calculation method; obtaining the at least two third image data items; and converting, based on the conversion parameter, the pixel displacement amount between the at least two third image data items into the actual displacement amount.

A conversion parameter calculation device according to an aspect of the present disclosure is a conversion parameter calculation device that calculates a conversion parameter for measuring, using images, an actual displacement amount that is an actual value of a displacement indicating movement of an object, the conversion parameter calculation device including: a first obtainer that obtains, from a first image capturing device, first image data obtained by the first image capturing device capturing an image of the object; a second obtainer that obtains, from a second image capturing device, second distance data indicating a distance from the second image capturing device to the object, and second image data obtained by the second image capturing device capturing an image of the object, the second image capturing device being disposed in a position different from a position of the first image capturing device; a third obtainer that obtains displacement direction information indicating a direction of the displacement of the object in three dimensions; a matcher that associates a position on the object in the first image data with a position on the object in the second image data; a position estimator that estimates the position of the first image capturing device relative to the position of the second image capturing device, based on the second distance data and a result of associating the positions; a distance calculator that calculates first distance data indicating a distance from the first image capturing device to the object, based on the position of the first image capturing device and the second distance data; and a parameter calculator that calculates the conversion parameter, using the first distance data and the displacement direction information, the conversion parameter being a parameter for converting, into the actual displacement amount, a pixel displacement amount at a measurement point on the object based on at least two third image data items captured by the first image capturing device at different times.

A conversion parameter calculation device according to an aspect of the present disclosure is a conversion parameter calculation device that calculates a conversion parameter for measuring, using images, an actual displacement amount that is an actual value of a displacement indicating movement of an object, the conversion parameter calculation device including: a first obtainer that obtains, from a first image capturing device, first image data obtained by the first image capturing device capturing an image of the object; a second obtainer that obtains, from a second image capturing device, second distance data indicating a distance from the second image capturing device to the object, and second image data obtained by the second image capturing device capturing an image that includes the object and the first image capturing device, the second image capturing device being disposed in a position different from a position of the first image capturing device; a third obtainer that obtains displacement direction information indicating a direction of the displacement of the object in three dimensions; a position estimator that detects a shape of the first image capturing device in the second image data, and estimates the position of the first image capturing device, based on a result of detecting the shape; a distance calculator that calculates first distance data indicating a distance from the first image capturing device to the object, based on the position of the first image capturing device and the second distance data; and a parameter calculator that calculates the conversion parameter, using the first distance data and the displacement direction information, the conversion parameter being a parameter for converting, into the actual displacement amount, a pixel displacement amount at a measurement point on the object based on at least two third image data items captured by the first image capturing device at different times.

A displacement amount calculation device according to an aspect of the present disclosure includes: a fourth obtainer that obtains the conversion parameter calculated using the above conversion parameter calculation device; a fifth obtainer that obtains the at least two third image data items; and a converter that converts, based on the conversion parameter, the pixel displacement amount between the at least two third image data items into the actual displacement amount.

Advantageous Effects

According to the conversion parameter calculation method and others according to an aspect of the present disclosure, a displacement amount can be accurately and readily converted into an actual value.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6 is a flowchart illustrating operation of the displacement measurement system according to a variation of Embodiment 1.

FIG. 12 is a flowchart illustrating operation of the displacement measurement system according to Embodiment 2.

DESCRIPTION OF EMBODIMENTS

Figure 1:
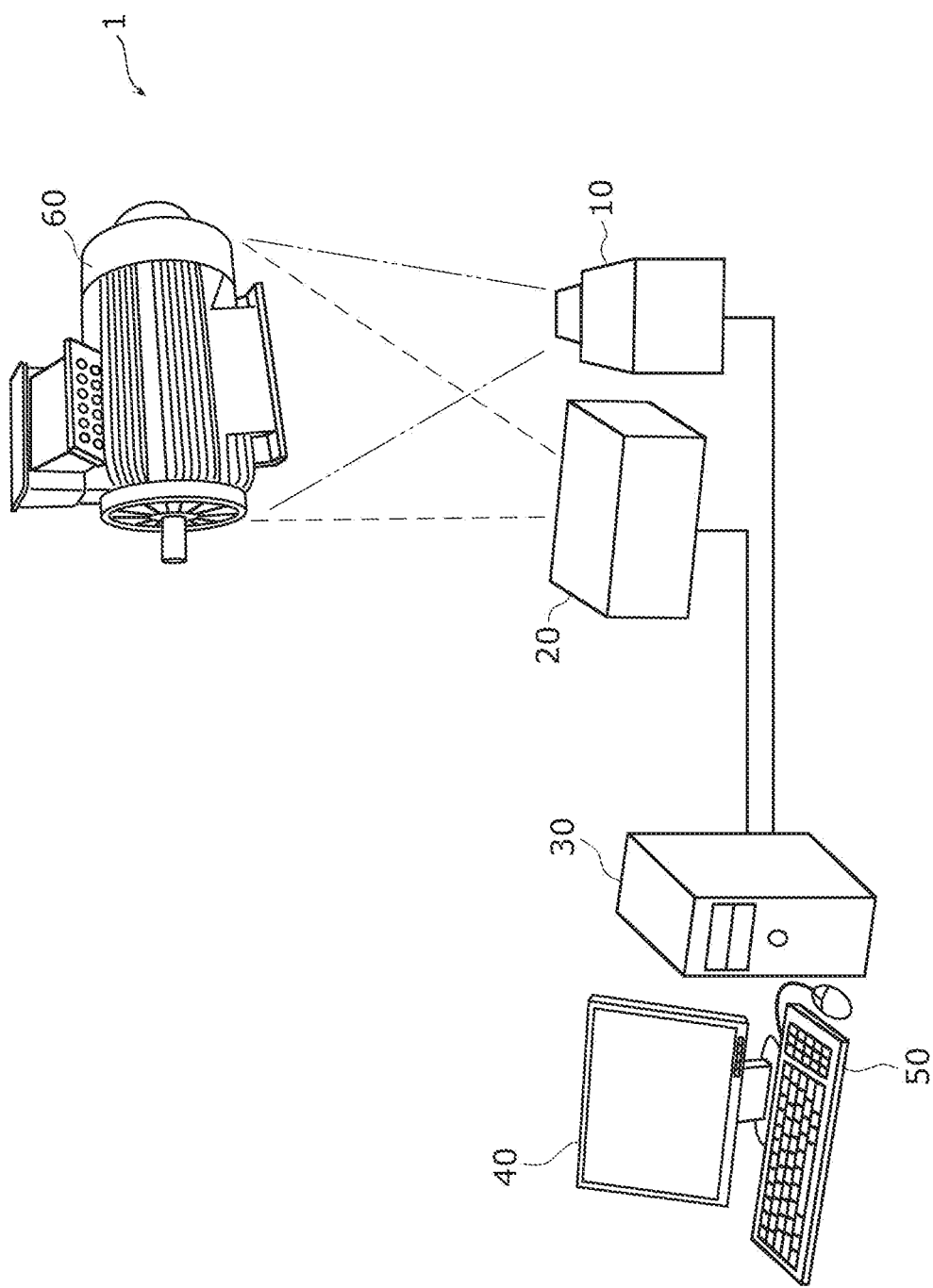
FIG. 1 illustrates a schematic configuration of a displacement measurement system according to Embodiment 1.

Circumstances That Have Led to the Present Disclosure

With the image capturing device according to PTL 1, a camera and a distance measurement device need to be disposed such that the optical axis of the camera and the optical axis of the distance measurement device are parallel to each other, in order to accurately measure the state of an object, as described above. PTL 1 uses a dedicated attaching tool in order to cause the optical axis of the camera and the optical axis of the distance measurement device to be parallel to each other.

However, in displacement measurement using images, desirably, an actual value of a physical quantity such as a displacement amount can be accurately and readily measured. For example, desirably, a displacement can be accurately measured even if the optical axis of the camera and the optical axis of the distance measurement device are not parallel to each other, which need to be parallel in PTL 1 In addition, for example, desirably, the actual value of a displacement can be readily measured without providing a dedicated attaching tool, for instance.

Another method for measuring an actual value of a displacement is a method for capturing an image that includes a specific portion, whose length is known, of an object for which displacement measurement is to be performed, and calculating a conversion value for converting one pixel into an actual value, based on the known length and the number of pixels of a portion on the image which corresponds to the specific portion. However, the specific portion is desirably a flat surface when this method is used. Thus, the method has a restriction on a shape of the specific portion of the object, and thus it is difficult to measure the actual value of a displacement at a measurement point on an object having a complicated shape.

With this method, the actual value of a displacement of the specific portion can be accurately measured, but it is difficult to accurately measure the actual value of a displacement of a portion other than the specific portion. This is because if the distance from the image capturing device to the specific portion and the distance from the image capturing device to the portion other than the specific portion are different from each other, an appropriate conversion value is different for each of the portions. With this method, the actual value of the displacement cannot be measured, unless the length of the specific portion is known.

In view of this, the inventors have made diligent examinations on, for instance, a conversion parameter calculation method for measuring the actual value of a displacement accurately and readily, or stated differently, with less restrictions as to how a camera and a distance measurement device are disposed and on the shape of an object, and have arrived at a conversion parameter calculation method and others as will be described below.

A conversion parameter calculation method according to an aspect of the present disclosure is a conversion parameter calculation method for calculating a conversion parameter for measuring, using images, an actual displacement amount that is an actual value of a displacement indicating movement of an object, the conversion parameter calculation method including: obtaining, from a first image capturing device, first image data obtained by the first image capturing device capturing an image of the object; obtaining, from a second image capturing device, second distance data indicating a distance from the second image capturing device to the object, and second image data obtained by the second image capturing device capturing an image of the object, the second image capturing device being disposed in a position different from a position of the first image capturing device; associating a position on the object in the first image data with a position on the object in the second image data; estimating the position of the first image capturing device relative to the position of the second image capturing device, based on the second distance data and a result of associating the positions; calculating first distance data indicating a distance from the first image capturing device to the object, based on the position of the first image capturing device and the second distance data; and calculating the conversion parameter, using the first distance data, the conversion parameter being a parameter for converting, into the actual displacement amount, a pixel displacement amount at a measurement point on the object based on at least two third image data items captured by the first image capturing device at different times.

Accordingly, according to the conversion parameter calculation method, first distance data indicating a distance from the first image capturing device to the object can be calculated based on the estimated position of the first image capturing device, and thus the first image capturing device and the second image capturing device do not need to be disposed such that the optical axis of the first image capturing device and the optical axis of the second image capturing device are parallel to each other. According to the conversion parameter calculation method, the conversion parameter can be calculated based on the first distance data, and thus even if the length of a specific portion of the object is unknown, a conversion parameter for converting a pixel displacement amount into the actual displacement amount can be calculated.

According to the conversion parameter calculation method, the distance from the first image capturing device to the object can be accurately obtained by estimating the first distance data. Thus, according to the conversion parameter calculation method, since the conversion parameter is calculated using the first distance data, a conversion parameter with which a more precise actual displacement amount can be calculated can be obtained. For example, a conversion parameter for calculating a further accurate actual displacement amount can be obtained as compared to the case where second distance data is used. Thus, according to the conversion parameter calculation method according to the present disclosure, since the displacement amount is calculated using a conversion parameter calculated using the conversion parameter calculation method, the displacement amount can be accurately and readily converted into the actual value in displacement measurement using images.

A conversion parameter calculation method according to an aspect of the present disclosure is a conversion parameter calculation method for calculating a conversion parameter for measuring, using images, an actual displacement amount that is an actual value of a displacement indicating movement of an object, the conversion parameter calculation method including: obtaining, from a first image capturing device, first image data obtained by the first image capturing device capturing an image of the object; obtaining, from a second image capturing device, second distance data indicating a distance from the second image capturing device to the object, and second image data obtained by the second image capturing device capturing an image that includes the object and the first image capturing device, the second image capturing device being disposed in a position different from a position of the first image capturing device; detecting a shape of the first image capturing device in the second image data; estimating the position of the first image capturing device, based on a result of detecting the shape; calculating first distance data indicating a distance from the first image capturing device to the object, based on the position of the first image capturing device and the second distance data; and calculating the conversion parameter, using the first distance data, the conversion parameter being a parameter for converting, into the actual displacement amount, a pixel displacement amount at a measurement point on the object based on at least two third image data items captured by the first image capturing device at different times.

Accordingly, position information of the first image capturing device can be estimated without being influenced by the position of a feature point or the number of feature points obtained from an image, since position information of the first image capturing device can be estimated using only second image data and distance data. Thus, position information of the first image capturing device can be readily estimated.

According to the conversion parameter calculation method, the distance from the first image capturing device to the object can be accurately obtained by estimating the first distance data. Thus, according to the conversion parameter calculation method, since the conversion parameter is calculated using the first distance data, a conversion parameter with which a more precise actual displacement amount can be calculated can be obtained. For example, a conversion parameter for calculating a further accurate actual displacement amount can be obtained as compared to the case where second distance data is used. Thus, according to the conversion parameter calculation method according to the present disclosure, since the displacement amount is calculated using a conversion parameter calculated using the conversion parameter calculation method, the displacement amount can be accurately and readily converted into the actual value in displacement measurement using images.

For example, the object has at least two measurement points for measuring the displacement, the at least two measurement points including the measurement point, the calculating of the first distance data includes calculating the first distance data indicating a distance from each of the at least two measurement points to the first image capturing device, to obtain at least two first distance data items, and the calculating of the conversion parameter, using the first distance data and the displacement direction information, includes calculating, for each of the at least two measurement points, a conversion value for the measurement point as the conversion parameter, based on one of the at least two first distance data items indicating the distance from the measurement point.

Accordingly, according to the conversion parameter calculation method, a correction value is calculated for each of a plurality of measurement points, and thus an actual displacement amount at each measurement point can be accurately calculated.

For example, the calculating of the first distance data includes calculating, for each of surface points on the object, the first distance data from the surface point to the first image capturing device to obtain first distance data items, the surface points including the at least two measurement points, and the calculating of the conversion parameter, using the first distance data and the displacement direction information, includes: calculating, for each of the surface points, a conversion value for the surface point, based on one of the first distance data items indicating the distance from the surface point, to calculate conversion values; and generating a conversion value map as the conversion parameter, based on the conversion values calculated.

Accordingly, according to the conversion parameter calculation method, when an actual displacement amount at a position other than the measurement points is to be measured, such an actual displacement amount can be readily measured using the conversion value map. Thus, convenience of the conversion parameter calculation method can be improved.

For example, the conversion parameter calculation method further includes obtaining displacement direction information indicating the direction of a displacement of the object, and in calculating the conversion parameter, the conversion parameter is calculated further using the displacement direction information.

Accordingly, according to the conversion parameter calculation method, a conversion value can be calculated using displacement direction information when the object is displaced in a direction crossing the image capturing surface of the first image capturing device in a top view of the object, and thus can further accurately measure the actual value of the displacement.

For example, the first image capturing device includes a first camera, the second image capturing device includes a second camera that captures the second image data, and a depth sensor that measures the distance indicated by the second distance data, and the first camera has a resolution and a frame rate at least one of which is higher than a resolution and a frame rate of the second camera.

Accordingly, based on monochrome image data captured by a monochrome camera, a pixel displacement amount of the object in the monochrome image data can be obtained. Typically, a monochrome camera can capture higher definition images than those captured by a color camera. Thus, a displacement is measured based on a monochrome image captured by a monochrome camera, so that the displacement can be measured highly accurately. In addition, a depth sensor is readily available, and thus a conversion parameter calculation method with high convenience can be provided.

A displacement amount calculation method according to an aspect of the present disclosure includes: obtaining the conversion parameter calculated using the conversion parameter calculation method; obtaining the at least two third image data items; and converting the pixel displacement amount between the at least two third image data items into the actual displacement amount.

Accordingly, the actual displacement amount can be measured using the conversion parameter calculated using the above conversion parameter calculation method, and thus the actual displacement amount of the object can be measured accurately and readily.

A conversion parameter calculation device according to an aspect of the present disclosure is a conversion parameter calculation device that calculates a conversion parameter for measuring, using images, an actual displacement amount that is an actual value of a displacement indicating movement of an object, the conversion parameter calculation device including: a first obtainer that obtains, from a first image capturing device, first image data obtained by the first image capturing device capturing an image of the object; a second obtainer that obtains, from a second image capturing device, second distance data indicating a distance from the second image capturing device to the object, and second image data obtained by the second image capturing device capturing an image of the object, the second image capturing device being disposed in a position different from a position of the first image capturing device; a matcher that associates a position on the object in the first image data with a position on the object in the second image data; a position estimator that estimates the position of the first image capturing device relative to the position of the second image capturing device, based on the second distance data and a result of associating the positions; a distance calculator that calculates first distance data indicating a distance from the first image capturing device to the object, based on the position of the first image capturing device and the second distance data; and a parameter calculator that calculates the conversion parameter, using the first distance data, the conversion parameter being a parameter for converting, into the actual displacement amount, a pixel displacement amount at a measurement point on the object based on at least two third image data items captured by the first image capturing device at different times.

Accordingly, advantageous effects similar to those yielded by the above conversion parameter calculation method can be yielded. Specifically, according to the conversion parameter calculation device, first distance data indicating a distance from the first image capturing device to the object can be calculated based on the estimated position of the first image capturing device, and thus it is unnecessary to dispose the first image capturing device and the second image capturing device such that the optical axis of the first image capturing device and the optical axis of the second image capturing device are parallel to each other. According to the conversion parameter calculation device, the conversion parameter can be calculated based on the first distance data, and thus even if the length of a specific portion of the object is unknown, a conversion parameter for converting a pixel displacement amount into the actual displacement amount can be calculated.

According to the conversion parameter calculation device, the distance from the first image capturing device to the object can be accurately obtained by estimating the first distance data. Thus, according to the conversion parameter calculation device, since the conversion parameter is calculated using the first distance data, a conversion parameter with which a more precise actual displacement amount can be calculated can be obtained. For example, a conversion parameter for calculating a further accurate actual displacement amount can be obtained as compared to the case where second distance data is used. Thus, according to the above conversion parameter calculation device, since the displacement amount is calculated using a conversion parameter calculated by the conversion parameter calculation device, the displacement amount can be accurately and readily converted into the actual value in displacement measurement using images.

A conversion parameter calculation device according to an aspect of the present disclosure is a conversion parameter calculation device that calculates a conversion parameter for measuring, using images, an actual displacement amount that is an actual value of a displacement indicating movement of an object, the conversion parameter calculation device including: a first obtainer that obtains, from a first image capturing device, first image data obtained by the first image capturing device capturing an image of the object; a second obtainer that obtains, from a second image capturing device, second distance data indicating a distance from the second image capturing device to the object, and second image data obtained by the second image capturing device capturing an image that includes the object and the first image capturing device, the second image capturing device being disposed in a position different from a position of the first image capturing device; a position estimator that detects a shape of the first image capturing device in the second image data, and estimates the position of the first image capturing device, based on a result of detecting the shape; a distance calculator that calculates first distance data indicating a distance from the first image capturing device to the object, based on the position of the first image capturing device and the second distance data; and a parameter calculator that calculates the conversion parameter, using the first distance data, the conversion parameter being a parameter for converting, into the actual displacement amount, a pixel displacement amount at a measurement point on the object based on at least two third image data items captured by the first image capturing device at different times.

Accordingly, advantageous effects similar to those yielded by the above conversion parameter calculation method can be yielded. Specifically, the conversion parameter calculation device can estimate position information of the first image capturing device using only second image data and distance data, and thus can readily estimate the position information of the first image capturing device.

According to the conversion parameter calculation device, the distance from the first image capturing device to the object can be accurately obtained by estimating the first distance data. Thus, according to the conversion parameter calculation device, since the conversion parameter is calculated using the first distance data, a conversion parameter with which a more precise actual displacement amount can be calculated can be obtained. For example, a conversion parameter for calculating a further accurate actual displacement amount can be obtained as compared to the case where second distance data is used. Thus, according to the above conversion parameter calculation device, since the displacement amount is calculated using a conversion parameter calculated by the conversion parameter calculation device, the displacement amount can be accurately and readily converted into the actual value in displacement measurement using images.

A displacement amount calculation device according to an aspect of the present disclosure includes: a fourth obtainer that obtains the conversion parameter calculated using the above conversion parameter calculation device; a fifth obtainer that obtains the at least two third image data items; and a converter that converts, based on the conversion parameter, the pixel displacement amount between the at least two third image data items into the actual displacement amount.

Accordingly, advantageous effects similar to those yielded by the above displacement amount calculation method can be yielded.

Note that these general and specific aspects may be implemented using a system, a method, an integrated circuit, a computer program, a computer-readable non-transitory recording medium such as a CD-ROM, or any combination of systems, methods, integrated circuits, computer programs, and recording media. The program may be prestored in a recording medium or may be supplied to a recording medium through a wide area communication network including the Internet.

The following specifically describes embodiments with reference to the drawings.

Note that embodiments and variations described below each show a general or specific example. The numerical values, shapes, materials, elements, and the arrangement and connection of the elements, steps, and the order of processing the steps, for instance, described in the following embodiments and variations are examples, and thus are not intended to limit the present disclosure. Among the elements in the following embodiments, elements not recited in any of the independent claims are described as arbitrary elements.

Note that the diagrams are schematic diagrams, and do not necessarily provide strict illustration. In the drawings, the same numeral is given to a substantially same element, and a redundant description thereof may be omitted or simplified.

In the Specification, terms that indicate a relation between elements such as orthogonal and the same, and numerical values do not necessarily have only strict meanings, and also cover substantially equivalent ranges that include a difference of about several percent, for example.

In addition, an image is a still image in the following description, but may be a video image.

Embodiment 1

The following describes a conversion parameter calculation method and others according to Embodiment 1, with reference to FIG. 1 to FIG. 5.

1-1. Configuration of Displacement Measurement System

First, displacement measurement system 1 that includes conversion parameter calculator 110 that executes the conversion parameter calculation method according to Embodiment 1 is to be described with reference to FIG. 1 and FIG. 2. FIG. 1 illustrates a schematic configuration of displacement measurement system 1 according to Embodiment 1.

Figure 2:
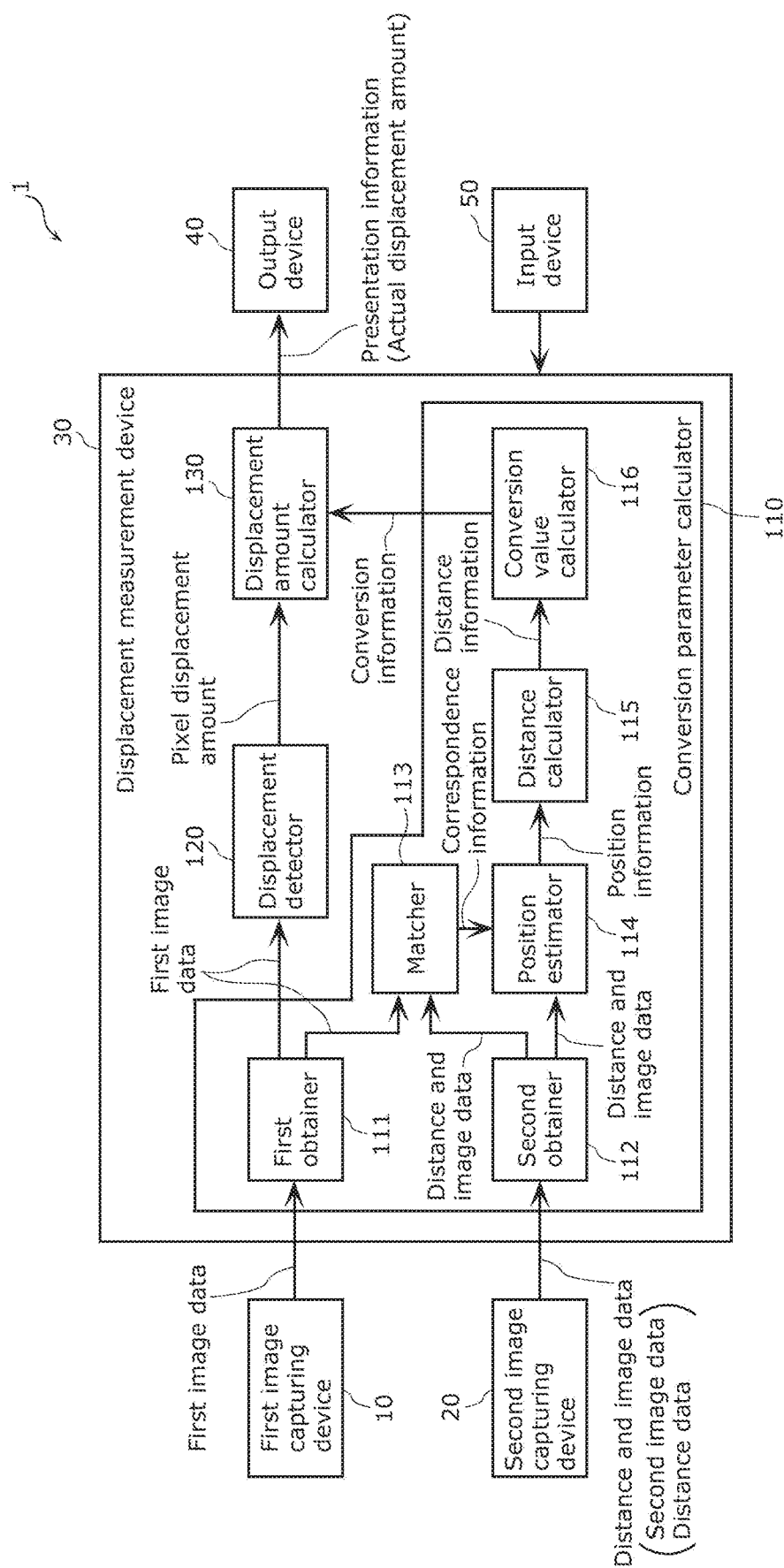
FIG. 2 is a block diagram illustrating a functional configuration of the displacement measurement system according to Embodiment 1.

FIG. 2 is a block diagram illustrating a functional configuration of displacement measurement system 1 according to Embodiment 1.

As illustrated in FIG. 1, displacement measurement system 1 according to Embodiment 1 is an information processing system that measures an actual value of a displacement of object 60, using two image capturing devices disposed in different positions. First image capturing device 10 and second image capturing device 20 capture images of object 60 from different viewpoints. Object 60 is a target whose displacement is to be measured, and is, for example, a device such as a motor that is displaced (shakes, for instance) during operation. Yet, object 60 is not limited thereto, and may be, for example, a structure such as an infrastructure structure that is displaced (deforms, for instance) due to stress from the outside. An infrastructure structure may be a bridge where vehicles such as cars and trains travel, for example. Note that the displacement in the Specification includes not only shakes of object 60, but also deformation of object 60 and a change in position thereof. It can also be said that a displacement indicates movement.

As illustrated in FIG. 1 and FIG. 2, displacement measurement system 1 includes first image capturing device 10, second image capturing device 20, displacement measurement device 30, output device 40, and input device 50.

First image capturing device 10 captures an image for measuring a displacement of object 60. The image captured by first image capturing device 10 is used to detect the displacement amount (the number of pixels) on an image corresponding to the displacement of object 60. Note that in the following, an image captured by first image capturing device 10 is also stated as a first image, and a displacement amount on an image corresponding to a displacement of object 60 is also stated as a pixel displacement amount. A pixel displacement amount is an example of a physical quantity in pixels (for example, the number of pixels). Further, a first image may be used to calculate a conversion value later described.

First image capturing device 10 is, for example, a monochrome camera. In other words, a first image is a monochrome image, for example. Note that first image capturing device 10 is not limited to a monochrome camera, and may be a color camera. First image capturing device 10 is a digital video camera or a digital still camera that includes an image sensor, for example. Note that first image capturing device 10 is an example of an image capturing device. The monochrome camera or the color camera that first image capturing device 10 includes is an example of a first camera. The first camera has a resolution and a frame rate at least one of which is higher than a resolution and a frame rate of a second camera later described. The first camera can capture an image having a higher resolution than the second camera and/or can capture images at a higher frame rate than the second camera, for example.

Second image capturing device 20 captures an image for measuring an actual value of a displacement of object 60. Second image capturing device 20 is configured to obtain an image of object 60 and a distance from second image capturing device 20 to object 60. An image captured by second image capturing device 20 and a distance measured by second image capturing device 20 are used to estimate the position of first image capturing device 10. Note that in the following, an image captured by second image capturing device 20 is also stated as a second image, and an actual value of a displacement of object 60 is also stated as an actual displacement amount. The actual displacement amount is an example of a physical quantity in the real space (a distance corresponding to the number of pixels, for example). The distance from second image capturing device 20 to object 60 is an example of a second distance.

Second image capturing device 20 includes an image capturer for capturing a second image and a distance measurer for measuring a distance. The image capturer is a color camera, for example, but may be a monochrome camera. It is sufficient if the image capturer can obtain a grayscale image of object 60. The distance measurer includes a depth sensor, for example. The depth sensor can measure a distance up to one point or each of multiple points on object 60, and obtains a distance between second image capturing device 20 and object 60 (a positional relation, for example), based on a time for a laser beam to reflect off object 60 and return. The depth sensor may be a laser imaging detection and ranging (lidar) sensor, for example. Note that the sensor included in the distance measurer is not limited to a depth sensor, and may be a time-of-flight (TOF) sensor, for example. Second image capturing device 20 may be configured to integrally or detachably include the image capturer and the distance measurer, for example. Note that second image capturing device 20 is an example of a measurement device. The monochrome camera or the color camera that second image capturing device 20 includes is an example of a second camera.

When a displacement of object 60 is less than or equal to a predetermined value, first image capturing device 10 and second image capturing device 20 may capture images of same object 60 at different times, for example. When a displacement of object 60 is greater than the predetermined value, first image capturing device 10 and second image capturing device 20 may capture images of object 60 synchronously, for example. The predetermined value may be set based on an error tolerance value of a displacement.

After being disposed, second image capturing device 20 may capture at least one image and make measurement at least once. When a displacement of object 60 is less than or equal to the predetermined value, image capturing by the image capturer of second image capturing device 20 and measurement by the distance measurer thereof may be conducted at different times, and may be conducted synchronously when a displacement of object 60 is greater than the predetermined value.

First image capturing device 10 and second image capturing device 20 may be fixed so that the positions thereof do not change during image capturing. Second image capturing device 20 may be disposed close to first image capturing device 10. First image capturing device 10 and second image capturing device 20 may be disposed in positions where images that include measurement points on object 60 can be obtained.

The first image may be an image having a resolution higher than that of the second image and/or may be an image captured under an image-capturing condition under which the frame rate is higher than that in the condition for the second image. Note that in Embodiment 1, the first image is a monochrome image and the second image is a color image, but are not limited thereto.

Displacement measurement device 30 is an information processing device that calculates a conversion value for converting a pixel displacement amount into an actual displacement amount, based on image data obtained from first image capturing device 10 and image data and distance data obtained from second image capturing device 20, and outputs the actual displacement amount of object 60 obtained using the calculated conversion value. Displacement measurement device 30 may be a server device, for example. Displacement measurement device 30 includes conversion parameter calculator 110, displacement detector 120, and displacement amount calculator 130.

Conversion parameter calculator 110 calculates a conversion value for converting a pixel displacement amount into an actual displacement amount, based on image data obtained from first image capturing device 10 and image data and distance data obtained from second image capturing device 20. Conversion parameter calculator 110 includes first obtainer 111, second obtainer 112, matcher 113, position estimator 114, distance calculator 115, and conversion value calculator 116.

First obtainer 111 obtains first image data indicating a first image from first image capturing device 10.

Second obtainer 112 obtains distance and image data from second image capturing device 20. Second obtainer 112 obtains second image data indicating a second image and distance data, for example.

First obtainer 111 and second obtainer 112 are communication interfaces (communication circuits) communicably connected to first image capturing device 10 and second image capturing device 20, respectively, through wireless or wired communication.

Matcher 113 associates a position on object 60 in first image data with a position on object 60 in second image data, by matching feature points in the first image data and the second image data. Matcher 113 associates the positions (for example, pixel positions) on object 60 in the first image data and the second image data. Accordingly, matcher 113 obtains correspondence information indicating a correspondence between the position on object 60 in first image data and the position on object 60 in the second image data. For a method of detecting feature points, any existing technique such as scale invariant feature transform (SIFT) may be used.

Position estimator 114 estimates the position of first image capturing device 10, based on correspondence information, distance data, and one or more internal parameters of first image capturing device 10. Specifically, position estimator 114 estimates the position of first image capturing device 10 in a coordinate system of second image capturing device 20. Note that the one or more internal parameters of first image capturing device 10 are assumed to be known. Further, the one or more internal parameters include at least one of, for example, a 3×3 parameter matrix (cameraMatrix), a distortion coefficient (distCoeffs) of a lens, or a focal distance thereof.

Distance calculator 115 calculates distance information indicating a distance from first image capturing device 10 to object 60, based on position information indicating the position of first image capturing device 10 and distance data. Distance calculator 115 calculates a distance from first image capturing device 10 to each of one or more measurement points on object 60, for example. Distance calculator 115 may calculate a distance up to each of surface points including the measurement points for measuring a displacement of object 60, for example. Distance calculator 115 may generate a distance map in which distances from first image capturing device 10 to object 60 are arranged. Note that the number of measurement points on object 60 is not limited in particular, and may be two or more.

Conversion value calculator 116 calculates a conversion value for converting a pixel displacement amount into an actual displacement amount, based on the position of first image capturing device 10, a distance from first image capturing device 10 to object 60, and the internal parameter(s) of first image capturing device 10. Calculation of a conversion value by conversion value calculator 116 is to be described later. Conversion value calculator 116 may calculate a conversion value for each of the surface points, and generate a conversion value map in which the calculated conversion values are arranged, for example. Note that the conversion values and the conversion value map are examples of conversion parameters. Conversion value calculator 116 is an example of a parameter calculator.

Note that an example in which conversion parameter calculator 110 is included in displacement measurement device 30 has been described, but the present embodiment is not limited thereto. Conversion parameter calculator 110 may be acquired as a single device. In this case, conversion parameter calculator 110 functions as a conversion parameter calculation device.

Note that displacement measurement device 30 is an example of a displacement amount calculation device.

Displacement detector 120 detects a pixel displacement amount (the number of pixels) on an image which corresponds to a displacement of object 60, based on two or more first image data items captured by first image capturing device 10. Displacement detector 120 detects a pixel displacement amount for each measurement point, for example.

Based on a pixel displacement amount and conversion information indicating a conversion parameter, displacement amount calculator 130 calculates an actual displacement amount of object 60 by converting the pixel displacement amount into the actual displacement amount. Displacement amount calculator 130 calculates actual displacement amounts at measurement points on object 60, based on, for example, conversion values for the measurement points and pixel displacement amounts at the measurement points.

Output device 40 obtains presentation information that includes an actual displacement amount from displacement measurement device 30, and outputs the obtained presentation information. Output device 40 is a display device that displays presentation information as an image, for example. Output device 40 is a liquid crystal display, for example. An image output by output device 40 is checked by a worker.

Output device 40 may be a stationary device or may be a device included in a mobile terminal that the worker has. The mobile terminal is not limited in particular as long as the mobile terminal includes output device 40 and can communicate with displacement measurement device 30, and may be a smartphone or a tablet terminal, for example. If the mobile terminal includes output device 40, the worker can be informed of an actual displacement amount by checking an image output by output device 40 of the mobile terminal in the vicinity of object 60. Note that the worker is an example of a user.

Displacement measurement system 1 may include a device that outputs sound as output device 40, together with or instead of the display device. Displacement measurement system 1 may include, as output device 40, a device that displays presentation information on a target object (for example, a screen) of a projector, for instance. If displacement measurement device 30 is disposed in a remote location, displacement measurement device 30 and output device 40 may be connected to each other via a network.

Input device 50 is a user interface that receives, from a worker, predetermined information for use in measurement of a displacement. Input device 50 may receive, from a worker, information for calculating a conversion value, information on a displacement direction of object 60, or information on an approximate position of first image capturing device 10, for example. Further, input device 50 may receive input of predetermined information through voice. Note that the approximate position is an estimated value of a position in which first image capturing device 10 is disposed.

Input device 50 is acquired with a hardware key (a hardware button), a slide switch, or a touch panel, for instance. Input device 50 may be a stationary device or may be a device included in a mobile terminal that a worker has.

1-2. Operation of Displacement Measurement System

Figure 3:
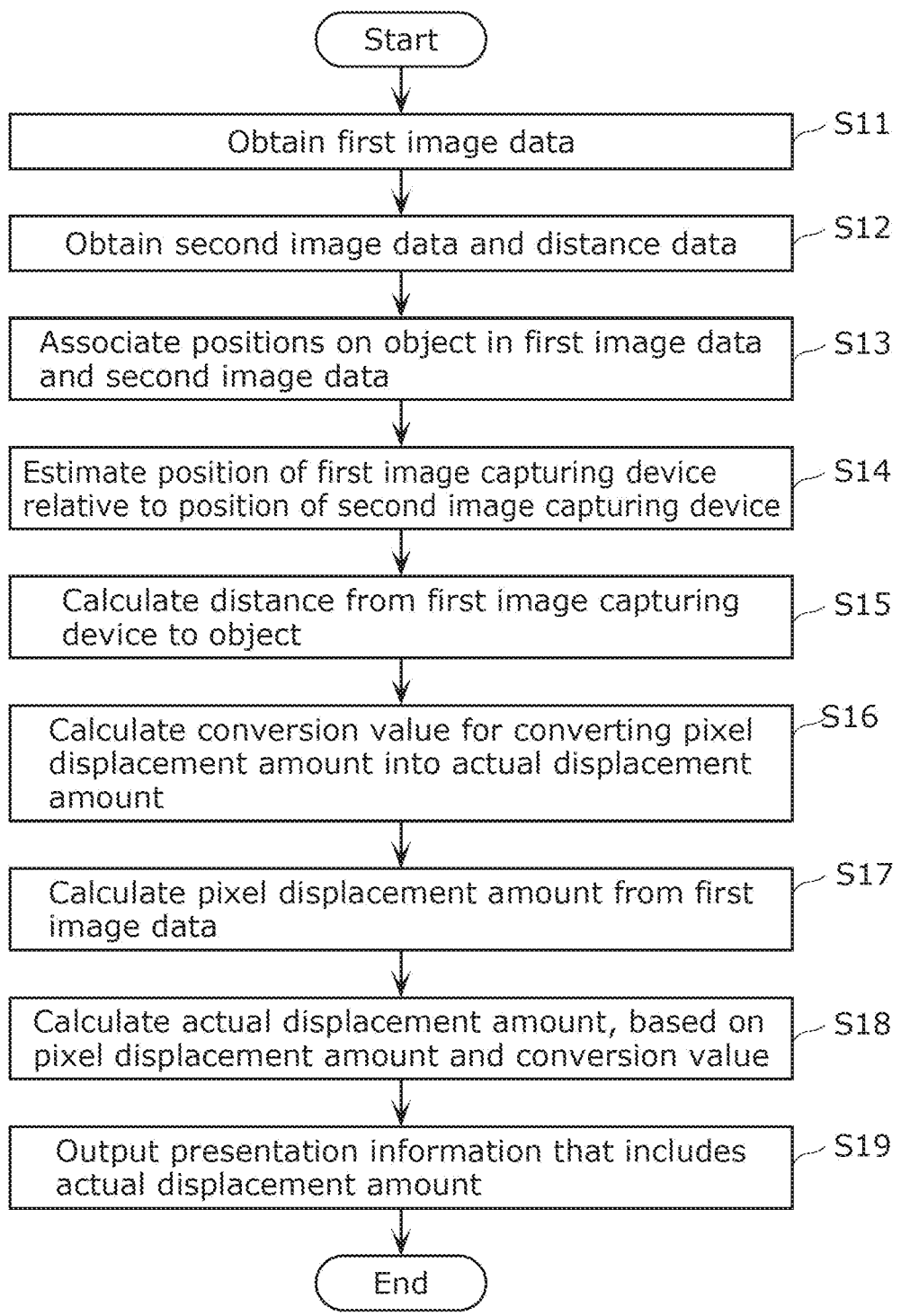
FIG. 3 is a flowchart illustrating operation of the displacement measurement system according to Embodiment 1.
Figure 4:
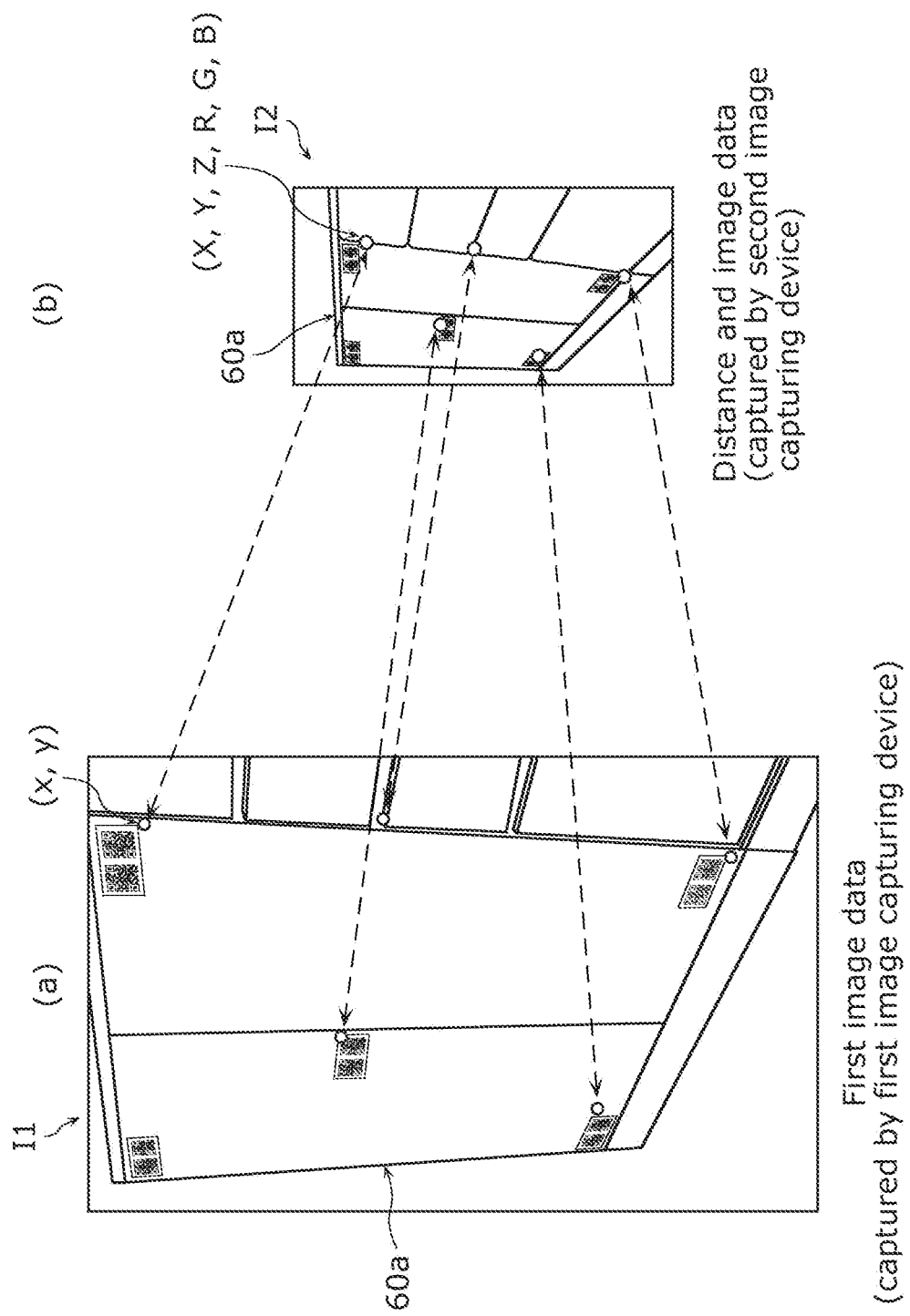
FIG. 4 is for describing feature point matching by a matcher according to Embodiment 1.

Next, operation of displacement measurement system 1 is to be described with reference to FIG. 3 to FIG. 5. FIG. 3 is a flowchart illustrating operation of displacement measurement system 1 according to Embodiment 1. Specifically, FIG. 3 is a flowchart illustrating operation of displacement measurement device 30. Steps S11 to S16 illustrated in FIG. 3 show operation of conversion parameter calculator 110. FIG. 4 is for describing feature point matching by matcher 113 according to Embodiment 1. Note that FIG. 4 illustrates an example in which object 60a is a piece of furniture. In addition, in order to explain feature points in a readily understandable manner, quick response codes (QR codes (registered trademark)) are applied to some of the feature points. The QR codes (registered trademark) may be provided in correspondence with the measurement points of object 60a.

As illustrated in FIG. 3, first obtainer 111 obtains first image data indicating a first image from first image capturing device 10 (S11). First obtainer 111 obtains first image data I1 as illustrated in (a) of FIG. 4, for example. In (a) of FIG. 4, the positions (x, y) indicated by circles show pixel positions of feature points on first image data I1, for example. The positions of five feature points are illustrated in (a) of FIG. 4. Further, QR codes (registered trademark) are captured in first image data I1.

Note that first obtainer 111 may obtain at least one first image data item in step S11 to calculate a conversion value. First obtainer 111 may obtain two or more first image data items captured at different times in step S11 to measure a displacement.

When first obtainer 111 obtains a plurality of first image data items, first obtainer 111 outputs at least one first image data item to matcher 113 and two or more first image data items to displacement detector 120. First obtainer 111 may output, to matcher 113 and displacement detector 120, different first image data items or first image data items that are at least partially the same. Two or more first image data items output to displacement detector 120 are captured at different times and are examples of third image data. Step S11 is an example of a the obtaining of the first image data. Step S11 may be an example of the obtaining of the at least two third image data items in the displacement amount calculation method described later. First obtainer 111 may function as a fourth obtainer that obtains at least two third image data items.

Next, second obtainer 112 obtains second image data indicating a second image and distance data indicating a distance from second image capturing device 20 (S12). Second obtainer 112 obtains distance and image data I2 that indicates second image data and distance data as illustrated in (b) of FIG. 4. Distance and image data I2 includes coordinates (X, Y, Z) indicating a position on object 60a relative to the position of second image capturing device 20 (shown by circles in (b) of FIG. 4, for example) and pixel values (R, G, B) that indicate colors at the positions.

Coordinates (X, Y, Z) are based on the position of second image capturing device 20 (coordinates (0, 0, 0), for example). Distance data is an example of second distance data.

Note that distance and image data I2 may not include color information. It is sufficient if distance and image data I2 is an image with which feature point matching with first image data I1 can be performed and which includes coordinates (X, Y, Z) indicating a position on object 60*a* relative to the position of second image capturing device 20. Also, distance and image data I2 may be, for example, an image that shows shading of object 60*a* and data that contains coordinates (X, Y, Z) indicating a position on object 60 relative to the position of second image capturing device 20. Distance and image data I2 may include a monochrome image or a shading image of object 60 captured.

Second obtainer 112 outputs distance and image data I2 to matcher 113 and position estimator 114. Note that second image data contains a pixel value (R, G, B) indicating a color, and distance data contains coordinates (X, Y, Z) indicating a position on object 60*a* relative to the position of second image capturing device 20. Further, step S12 is an example of the obtaining of the second distance data and the second image data.

Next, matcher 113 associates positions on object 60 in first image data I1 and second image data in distance and image data I2 (S13). If an explanation is given using first image data I1 and distance and image data I2 illustrated in FIG. 4, for example, five feature point matching candidates (shown by circles in (a) and (b) of FIG. 4) are extracted, and positions in first image data I1 and distance and image data I2 are associated with one another. Matcher 113 associates a pixel position (x, y) in first image data I1 with coordinates (X, Y, Z) in distance and image data I2. Matcher 113 locates, in distance and image data I2, a position of a portion of object 60 in pixel position (x, y) in first image data I1, to associate the positions, for example.

For example, matcher 113 associates a pixel position (x, y) in first image data I1 with coordinates (X, Y, Z) in distance data corresponding to the pixel position, based on association between the pixel position (x, y) in first image data I1 and a pixel position (x1, y1) in second image data. Matcher 113 relates the pixel position (x, y) in first image data I1 to the distance data corresponding to the pixel position.

Matcher 113 determines five sets of feature points, for example, yet the number of sets of feature points is not limited thereto and appropriately determines the number of sets depending on, for instance, how correspondences are obtained. Matcher 113 may determine four sets of feature points or may determine six sets of feature points, for example. Note that the method of calculating correspondences and the number of feature points are examples, and are not limited to those stated above. In the following, the number of sets of feature points is stated as n.

Matcher 113 outputs, to position estimator 114, correspondence information indicating correspondences of positions between first image data I1 and second image data. Matcher 113 outputs correspondence information indicating five sets of feature points determined as above, for example. Note that step S13 is an example of the associating.

Next, position estimator 114 estimates the position of first image capturing device 10 relative to the position of second image capturing device 20, based on correspondence information, distance data, and one or more internal parameter of first image capturing device 10 (S14). If position estimator 114 is informed of correspondences of n sets of feature points in first image data I1 and distance and image data I2, position estimator 114 can estimate the position of first image capturing device 10 in a coordinate system of second image capturing device 20 by solving a perspective-n-point (PnP) problem. Note that the one or more internal parameters of first image capturing device 10 are known.

Position estimator 114 estimates a position and an orientation of first image capturing device 10 relative to those of second image capturing device 20 by calculating R (rotation) and T (position), using each set of feature points whose reprojection error is less than or equal to a reference value, for example. Position estimator 114 calculates R (rotation matrix) and T (translation vector) that minimize the reprojection error, for example. R (rotation matrix) is an external parameter indicating an orientation of first image capturing device 10. T (translation vector) is an external parameter indicating a position of first image capturing device 10. Note that it is sufficient if position estimator 114 estimates at least a position.

Matcher 113 and position estimator 114 may execute processing of estimating a position of first image capturing device 10 by robust estimation that decreases influence of an outlier in order to remove an incorrect correspondence of feature points, for example. Matcher 113 and position estimator 114 may estimate a position of first image capturing device 10 by random sample consensus (RANSAC) estimation, median estimation, or M-estimation, for instance, which are examples of robust estimation, for example. RANSAC estimation may be an estimation method based on a reprojection error, for example. A reprojection error is expressed by a square error of a second position (xi, yi) in second image data on which a first position (Xi, Yi, Zi) in distance data obtained using a function for converting one coordinate system into another coordinate system, and a third position (xi0, yi0) in first image data which corresponds to the second position. An example of a function for converting one coordinate system into another coordinate system is a projectPoints function.

Matcher 113 randomly selects n sets of feature points, and calculates a position of first image capturing device 10, for example. Matcher 113 calculates the number of sets of features points whose reprojection error is less than or equal to the reference value, out of the n sets. Matcher 113 repeats the above processing for each feature point in an image, and determines n sets of feature points that include the greatest number of sets of feature points whose reprojection error is less than or equal to the reference value. Position estimator 114 may estimate a position of first image capturing device 10, using the n sets of feature points, for example. Note that n sets may be six sets, for example. Thus, position estimator 114 may estimate a position of first image capturing device 10 by solving the P6P problem.

In this manner, matcher 113 and position estimator 114 obtain correspondences of feature points of object 60 between first image data I1 and the second image data, and estimate a position of first image capturing device 10 using the correspondences. Thus, displacement measurement device 30 according to Embodiment 1 can estimate a position of first image capturing device 10 even if positions and orientations in which first image capturing device 10 and second image capturing device 20 are disposed are different.

Position estimator 114 outputs position information indicating the estimated position of first image capturing device 10 to distance calculator 115. Note that step S14 is an example of the estimating.

Distance calculator 115 calculates a distance from first image capturing device 10 to object 60, based on position information and distance data (S15). Distance calculator 115 calculates a distance from first image capturing device 10 to object 60, based on a position (coordinates) of first image capturing device 10 included in position information and coordinates (X, Y, Z) of object 60 based on distance data. It can be said that distance calculator 115 converts a distance up to object 60 measured by the distance measurer of second image capturing device 20 into a distance up to object 60 when viewed from first image capturing device 10. Accordingly, a position on object 60 when viewed from first image capturing device 10 is obtained. For example, distances up to measurement points on object 60 when viewed from first image capturing device 10 are obtained. Data that includes a distance (a distance from first image capturing device 10 to object 60) calculated by distance calculator 115 is an example of first distance data. A distance calculated by distance calculator 115 is an example of a first distance. Distance calculator 115 outputs distance information indicating a distance between first image capturing device 10 and object 60 to conversion value calculator 116. Note that step S15 is an example of the calculating of the first distance data.

Conversion value calculator 116 calculates a conversion value for converting a pixel displacement amount into an actual displacement amount, based on the position of first image capturing device 10, distance information, and the internal parameter(s) of first image capturing device 10 (S16). Conversion value calculator 116 calculates a conversion value for each of measurement points of object 60, for example. The conversion value for a measurement point includes information indicating an actual value corresponding to one pixel at the measurement point, for example. Step S16 is an example of the calculating of the conversion parameter. Further, step S16 may be an example of the obtaining of the conversion parameter.

Here, processing by conversion value calculator 116 is to be described with reference to FIG. 5. FIG. 5 is for describing a method for converting a displacement into an actual size according to Embodiment 1. Note that FIG. 5 illustrates an example in which object 60 is displaced in a direction parallel to an image capturing surface (a projection surface) of first image capturing device 10. Optical center O illustrated in FIG. 5 indicates a center of lens 11 of first image capturing device 10, position P1 (x, y) indicates a position on the image capturing surface corresponding to position M1 (Y, Y, Z) at a measurement point on object 60 at a first time point, and displacement ($\Delta x1$, $\Delta y1$) on an image indicates a difference between position P1 and position P2 on the image capturing surface corresponding to position M2 at the measurement point at a second time point different from the first time point. A displacement ($\Delta x1$, $\Delta y1$) is represented by the number of pixels on an image.

Figure 5:
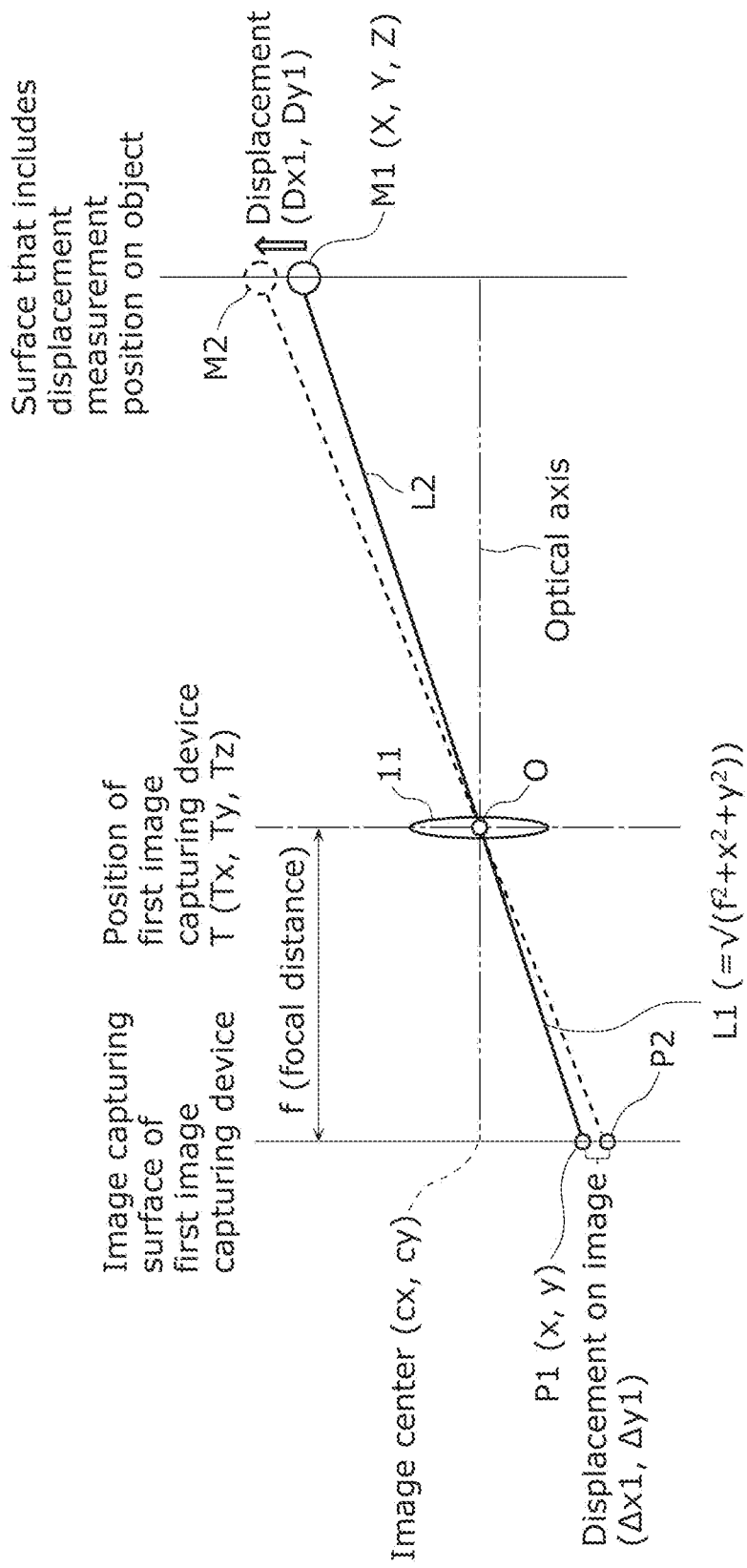
FIG. 5 is for describing a method for converting a displacement into an actual size according to Embodiment 1.

As illustrated in FIG. 5, triangle $\Delta OP1P2$ and triangle $\Delta OM1M2$ are in a relation of similarity, and conversion value calculator 116 calculates a conversion value for converting a pixel displacement amount into an actual displacement amount using the relation of similarity, for example. When a distance between an image center (cx, cy) on the image capturing surface of first image capturing device 10 and optical center O is focal distance f, distance L1 between optical center O and position P1 is calculated by:

$$L1=\sqrt{(f^2+x^2+y^2)} \quad \text{(Expression 1)}$$

The first time point is an initial time point when object 60 is not displaced, for example.

Assuming that the actual displacement amount is a displacement (Dx1, Dy1), from a similarity relation of triangle $\Delta OP1P2$ and triangle $\Delta OM1M2$, the following expression holds for distance L2 from optical center O and position M1:

$$L2:L1=Dy1:\Delta y1=Dx1:\Delta x1 \quad \text{(Expression 2)}$$

If distance L2, that is, the distance from optical center O to position M1 is known from (Expression 2), displacement (Dx1, Dy1) that is the actual displacement amount can be calculated. Distance calculator 115 calculates distance L2 for each measurement point, since distance L2 may vary for each measurement point.

Conversion value calculator 116 calculates a conversion value, based on (Expression 2) above. A conversion value for calculating displacement Dx1 is based on (Expression 2) and is L2/L1. A conversion value for calculating displacement Dy1 is also based on (Expression 2) and is L2/L1.

Note that the image center (cx, cy) and focal distance f are obtained as internal parameters of first image capturing device 10. Conversion value calculator 116 may calculate internal parameters of first image capturing device 10 using a chart image.

Conversion value calculator 116 outputs conversion information indicating the calculated conversion value to displacement amount calculator 130. Displacement amount calculator 130 obtains the conversion information from conversion value calculator 116. Displacement amount calculator 130 functions as a third obtainer that obtains a conversion parameter.

Next, displacement detector 120 calculates, from first image data I1, a pixel displacement amount by which object 60 is displaced in first image data I1 (S17). Displacement detector 120 calculates a pixel displacement amount from the displacement of object 60 projected on the image capturing surface of first image capturing device 10, for example. Displacement detector 120 calculates, for each of measurement points on object 60, the number of pixels on an image which corresponds to the displacement at the measurement point, for example. Displacement detector 120 outputs the calculated pixel displacement amount to displacement amount calculator 130.

Displacement amount calculator 130 calculates an actual displacement amount, based on a pixel displacement amount and a conversion value (S18). Displacement amount calculator 130 calculates, for each of the measurement points on object 60, an actual displacement amount at the measurement point by computing a pixel displacement amount at and a conversion value for the measurement point. Accordingly, displacement amount calculator 130 functions as a converter that coverts a pixel displacement amount between at least two third image data items into an actual displacement amount, based on the conversion information.

Displacement amount calculator 130 outputs presentation information that includes the calculated actual displacement amount to output device 40 (S19). Output device 40 displays presentation information obtained from displacement amount calculator 130 as an image. Note that step S19 is an example of the converting of the pixel displacement amount.

Note that the operation stated in steps S11 to S16 illustrated in FIG. 3 may be performed each time processing of calculating an actual displacement amount of object 60 is executed or may be performed each time at least one of a disposition position, an orientation, or camera parameters (including the internal parameter(s)) of at least one of first image capturing device 10 or second image capturing device 20 is changed. Conversion value calculator 116 may store calculated conversion values into a storage (not illustrated). When conversion value calculator 116 calculates an actual displacement amount of object 60, conversion value calculator 116 may read a conversion value from the storage and output the read conversion value to displacement amount calculator 130. Thus, conversion value calculator 116 may use a conversion value calculated in the past as a conversion value for calculating a current actual displacement amount. Accordingly, the amount of processing by conversion parameter calculator 110 can be decreased.

Steps S11 to S16 described above are processes executed in the conversion parameter calculation method for calculating a conversion parameter. Steps S17 to S19 are processes executed in the displacement amount calculation method for calculating an actual displacement amount. Note that the displacement amount calculation method may include processes of steps S11 to S16.

As described above, displacement measurement system 1 according to Embodiment 1 includes first image capturing device 10 and second image capturing device 20 disposed in different positions, and displacement measurement device 30 that includes conversion parameter calculator 110. Conversion parameter calculator 110 estimates a position of first image capturing device 10, based on first image data I1 obtained from first image capturing device 10 and distance and image data I2 obtained from second image capturing device 20. Conversion parameter calculator 110 estimates the position of first image capturing device 10, and thus displacement measurement device 30 can accurately calculate the actual value of displacement even if first image capturing device 10 and second image capturing device 20 initially have different positions and orientations.

As described above, according to displacement measurement system 1, less restrictions are imposed on the positions and orientations of first image capturing device 10 and second image capturing device 20, and thus it is unnecessary to finely adjust the positions and orientations of first image capturing device 10 and second image capturing device 20. Accordingly, time taken to dispose the image capturing devices can be shortened at the measurement site. As compared to the case where the actual displacement amount of object 60 is measured by the multi-viewpoint method, less image capturing devices are disposed, and thus can be readily disposed and collected at the measurement site.

As described above, conversion parameter calculator 110 calculates a conversion value for converting the pixel displacement amount into the actual displacement amount, using the estimated position of first image capturing device 10, for example. Accordingly, conversion parameter calculator 110 can measure the actual displacement amount of object 60 even if a scale marker cannot be applied onto object 60 or the actual length of a specific portion of object 60 is unknown.

As described above, conversion parameter calculator 110 calculates a conversion value for each of measurement points on object 60, for example. Accordingly, an operator can select a measurement point, without paying attention to differences in distance between first image capturing device 10 and the measurement points. Stated differently, the degree of freedom of selecting a measurement point is enhanced with conversion parameter calculator 110.

Displacement measurement device 30 measures the actual displacement amount of a displacement of object 60, using two or more first image data items captured by first image capturing device 10. Accordingly, displacement measurement device 30 can measure the actual displacement amount even when the displacement of object 60 is based on vibrations having such a cycle that the vibrations cannot be measured using a laser displacement gauge, for instance.

Note that the present embodiment has described an example in which a physical quantity in the real space is the actual displacement amount, but the physical quantity is not limited thereto. The physical quantity in the real space is not limited in particular as long as the quantity can be obtained from image data, and may be a length or an area, for example. Further, the physical quantity in the real space may be a speed at which a displacement is made, for instance, based on the actual displacement amount between a plurality of frames. In this case, in the calculating of the conversion parameter (corresponding to S16), a conversion parameter for converting the physical quantity in pixels at a measurement point on object 60 based on at least two third image data items captured by first image capturing device 10 at different times into a physical quantity in the real space is calculated using first distance data. Further, in this case, displacement measurement device 30 described in the present embodiment can also be considered as a physical quantity measurement device.

A conversion parameter calculation method for calculating a conversion parameter for calculating a physical quantity in such a real space is described below. For example, a conversion parameter calculation method for calculating a conversion parameter for measuring, using images, an actual displacement amount that is an actual value of a physical quantity in a real space of object 60 may include: obtaining, from first image capturing device 10, first image data I1 obtained by first image capturing device 10 capturing an image of object 60 (corresponding to S11); obtaining, from second image capturing device 20, second distance data indicating a distance from second image capturing device 20 to object 60, and second image data obtained by second image capturing device 20 capturing an image of object 60, second image capturing device 20 being disposed in a position different from a position of first image capturing device 10 (corresponding to S12); associating a position on object 60 in first image data I1 with a position on object 60 in the second image data (corresponding to S13); estimating the position of first image capturing device 10 relative to the position of second image capturing device 20, based on the second distance data and a result of associating the positions (S14); calculating distance data indicating a distance from first image capturing device 10 to object 60, based on the position of first image capturing device 10 and the second distance data (S15); and calculating a conversion value (an example of the conversion parameter), using the first distance data, the conversion value being a value for converting, into a physical quantity in a real space, a physical quantity in pixels at a measurement point on object 60 based on third image data captured by first image capturing device 10 (corresponding to S16).

For example, conversion parameter calculation device 110 that calculates a conversion parameter for measuring, using images, an actual physical quantity that is an actual value of a physical quantity in a real space of object 60 may be acquired. For example, conversion parameter calculation device 110 may include: first obtainer 111 that obtains, from first image capturing device 10, first image data obtained by first image capturing device 10 capturing an image of object 60; second obtainer 112 that obtains, from second image capturing device 20, second distance data indicating a distance from second image capturing device 20 to object 60, and second image data obtained by second image capturing device 20 capturing an image of object 60, second image capturing device 20 being disposed in a position different from a position of first image capturing device 10; matcher 113 that associates a position on object 60 in the first image data with a position on object 60 in the second image data; position estimator 114 that estimates the position of first image capturing device 10 relative to the position of second image capturing device 20, based on the second distance data and a result of associating the positions; distance calculator 115 that calculates first distance data indicating a distance from first image capturing device 10 to object 60, based on the position of first image capturing device 10 and the second distance data; and conversion value calculator 116 that calculates the conversion parameter, using the first distance data, the conversion parameter being a parameter for converting, into the physical quantity in the real space, a physical quantity in pixels at a measurement point on object 60 based on third image data captured by first image capturing device 10.

Variation of Embodiment 1

Figure 7A:
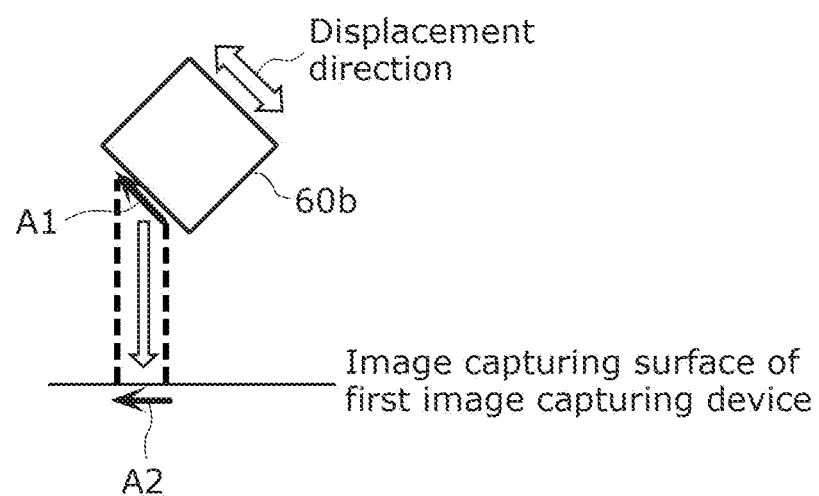
FIG. 7A is a first diagram for describing displacement conversion according to the variation of Embodiment 1, with the displacement direction taken into consideration.
Figure 7B:
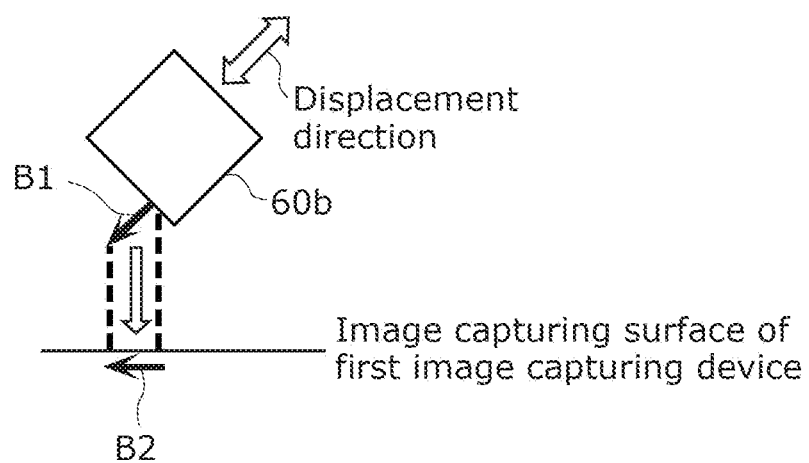
FIG. 7B is a second diagram for describing displacement conversion according to the variation of Embodiment 1, with the displacement direction taken into consideration.
Figure 8:
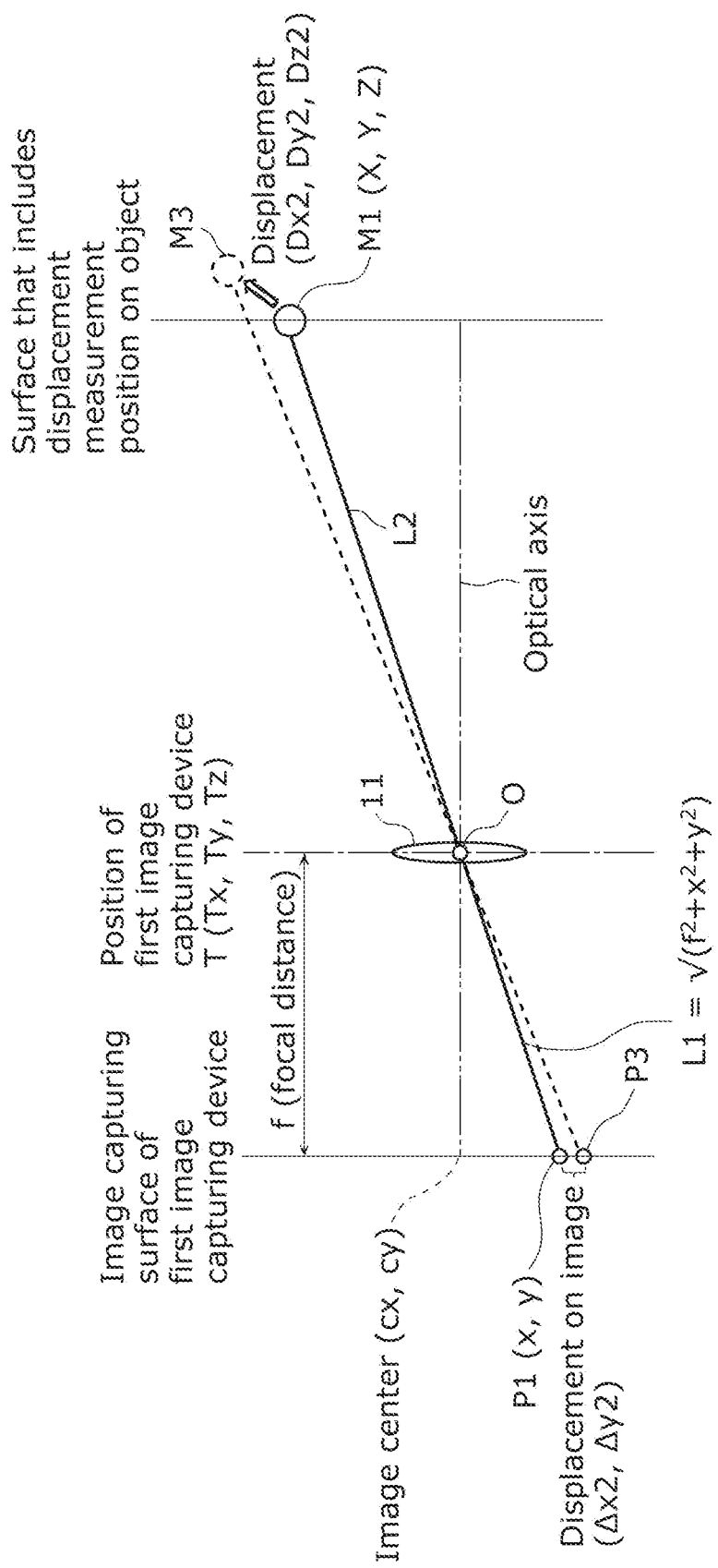
FIG. 8 is for describing a method for converting a displacement into an actual size according to the variation of Embodiment 1.

The following describes a conversion parameter calculation method and others according to this variation, with reference to FIG. 6 to FIG. 8. Note that the following description focuses on differences from Embodiment 1, and the same signs are assigned to equivalent elements to those of Embodiment 1, so that a description thereof may be omitted or simplified. The configuration of the displacement measurement system according to this variation is similar to displacement measurement system 1 according to Embodiment 1, and a description thereof is omitted.

Displacement measurement system 1 according to this variation has a feature that even if the displacement direction of object 60 is different from the direction parallel to the image capturing surface (a projection surface) of first image capturing device 10, the actual displacement amount can be accurately calculated. FIG. 6 is a flowchart illustrating operation of displacement measurement system 1 according to this variation.

As illustrated in FIG. 6, conversion value calculator 116 obtains displacement direction information of object 60 (S21). Conversion value calculator 116 may obtain displacement direction information via input device 50, for example. When object 60 is a motor, for example, displacement direction information may indicate a displacement direction based on a driving direction of a driver of the motor. For example, when the displacement direction of object 60 can be predicted based on the design, displacement direction information may indicate the predicted displacement direction. Further, for example, when object 60 is a bridge, for instance, and receives stress from vehicles, for instance, the displacement direction information may indicate a direction in which the stress is applied (for example, a vertical direction). The displacement direction information may indicate a direction relative to the image capturing surface of first image capturing device 10, for example. Further, the displacement direction indicated by displacement direction information is not limited to a single direction and may be two or more directions. Step S21 is an example of the obtaining of the displacement direction information.

Note that the displacement direction information is not limited to the one obtained via input device 50. Displacement direction information may be determined based on, for example, two or more distance and image data items I2 (second image data, for example). In this case, second obtainer 112 obtains, from second image capturing device 20, two or more distance and image data items I2 captured at different times, and outputs obtained two or more distance and image data items I2 to conversion value calculator 116 (not illustrated). Conversion value calculator 116 may obtain displacement direction information by identifying a displacement direction based on the position (X, Y, Z) of a predetermined measurement point included in each of two or more distance and image data items I2. Since two or more distance and image data items I2 are used, when a displacement is a vibration having a short cycle, for instance, it is difficult to accurately measure the actual displacement amount, yet the displacement direction can be obtained.

The orientation of a surface that includes a displacement measurement point on object 60 may be obtained from distance and image data I2, and the displacement direction may be defined relative to the orientation of this surface (the direction normal or parallel to the surface, for instance).

Note that displacement direction information may be obtained based on first image data I1. QR codes (registered trademark) may be applied to object 60, as illustrated in (a) of FIG. 4, for example. In addition, the QR codes (registered trademark) may store therein information regarding the displacement direction of object 60. Conversion value calculator 116 may obtain the displacement direction of object 60, based on a QR code (registered trademark) included in first image data I1. In this case, the displacement direction may be a direction relative to the surface of object 60 onto which the QR code (registered trademark) is applied, for example.

Note that as long as displacement direction information can be obtained based on first image data I1, the present embodiment is not limited to a QR code (registered trademark) being applied to object 60. For example, an augmented reality (AR) marker may be applied to object 60. Based on an AR marker included in first image data I1, for example, conversion value calculator 116 may obtain displacement direction information associated with the AR marker. The displacement direction information may be displayed, being superimposed on first image data I1, for example.

Conversion value calculator 116 calculates a conversion value for converting a pixel displacement amount into an actual displacement amount, based on the position of first image capturing device 10, distance information, the internal parameter(s) of first image capturing device 10, and displacement direction information (S22). Stated differently, conversion value calculator 116 calculates a conversion value using displacement direction information, in addition to those used in Embodiment 1. Note that step S22 is an example of the calculating of the conversion parameter.

Here, displacement conversion using displacement direction information is to be described with reference to FIG. 7A and FIG. 7B. FIG. 7A is a first diagram for describing displacement conversion according to this variation, with the displacement direction taken into consideration. Further, FIG. 7B is a second diagram for describing displacement conversion according to this variation, with the displacement direction taken into consideration. FIG. 7A and FIG. 7B are bird's-eye views of object 60*b* from above. The shape of object 60*b* is a square, for convenience.

As illustrated in FIG. 7A and FIG. 7B, when object 60*b* is viewed from above, if the displacement direction of object 60*b* is not parallel to the image capturing surface of first image capturing device 10, only the displacement of object 60*b* in a direction parallel to the image capturing surface out of the displacement thereof is projected onto the image capturing surface. In FIG. 7A, the displacement direction is a direction that connects the upper left and the lower right on the drawing. In this case, for example, if the displacement at a measurement point on object 60*b* is A1, the displacement at a measurement point on object 60*b* projected on the image capturing surface is A2. Displacement A2 is a component in a direction parallel to the image capturing surface when displacement A1 is made.

In FIG. 7B, the displacement direction is a direction that connects the lower left and the upper right on the drawing. In this case, for example, if the displacement at a measurement point on object 60b is B1, the displacement at a measurement point on object 60b projected on the image capturing surface is B2. Displacement B2 is a component in a direction parallel to the image capturing surface when displacement B1 is made. For example, if displacement A1 and displacement B1 have directions orthogonal to each other and have the same displacement amount, the direction and the magnitude of displacements A2 and B2 on the image capturing surface are the same. Note that displacements A1 and B1 are actual displacement amounts, and are actual values, for example. In addition, displacements A2 and B2 are pixel displacement amounts, and are represented by the numbers of pixels, for example.

In this manner, displacements A1 and B1 whose actual displacement directions are different from each other may be detected as the displacements in the same direction on the image capturing surface. Thus, the displacement in a direction horizontal to the image capturing surface can be measured, yet the displacement in a direction perpendicular to the image capturing surface cannot be measured.

In view of this, in this variation, conversion value calculator 116 obtains displacement direction information of object 60 in step S21, and calculates in step S22 a conversion value for converting the pixel displacement amount of object 60 in first image data I1 into the actual displacement amount, using the displacement direction information, as described above. The conversion value here includes information indicating an actual value corresponding to one pixel and the displacement direction. The conversion value may include information indicating actual values (Xa, Yb, Zc) each corresponding to one pixel, for example. Actual value Xa indicates an actual value of a displacement in the X-axis direction in a three-dimensional orthogonal coordinate system in the real space when a shift is made by one pixel on the image capturing surface. Actual value Yb indicates an actual value of a displacement in the Y-axis direction in the three-dimensional orthogonal coordinate system in the real space when a shift is made by one pixel on the image capturing surface. Actual value Zc indicates an actual value of a displacement in the Z-axis direction in the three-dimensional orthogonal coordinate system in the real space when a shift is made by one pixel on the image capturing surface. Actual values (Xa, Yb, Zc) are examples of conversion parameters. Note that a method for calculating a conversion value is not limited to those described above.

Here, processing by conversion value calculator 116 is to be described with reference to FIG. 8. FIG. 8 is for describing a method for converting a displacement into an actual size according to this variation.

As illustrated in FIG. 8, assuming that position P1 on the image capturing surface corresponding to position M1 (X, Y, Z) at a measurement point on object 60 at a first time point is (x, y), distance L1 from optical center O to position P1 can be calculated by (Expression 1). The first time point is an initial time point when object 60 is not displaced, for example. Further, assuming that a difference (displacement) between position P1 and position P3 on the image capturing surface corresponding to position M3 at a measurement point at a second time point different from the first time point is ($\Delta$x2, $\Delta$y2), a first conversion value can be calculated by (Expression 2). The first conversion value here is a value with which the actual displacement amount of a displacement in a direction parallel to the image capturing surface of first image capturing device 10 can be calculated. The first conversion value is a value with which out of a displacement (Dx2, Dy2, Dz2) in the actual value, a displacement (Dx2, Dy2) can be calculated from the displacement ($\Delta$x2, $\Delta$y2) on an image, for example.

Conversion value calculator 116 converts the calculated first conversion value into a second conversion value that is three-dimensional information, based on the calculated first conversion value and displacement direction information. Conversion value calculator 116 calculates the second conversion value for converting a pixel displacement amount that is two-dimensional information indicating a displacement on the image capturing surface into an actual displacement amount that is three-dimensional information. Conversion value calculator 116 may calculate the second conversion value based on the first conversion value and an angle between the image capturing surface of first image capturing device 10 and the displacement direction. The second conversion value is a value with which the displacement (Dx2, Dy2, Dz2) in the actual value can be calculated from the displacement ($\Delta$x2, $\Delta$y2) on the image, for example. Note that the method used by conversion value calculator 116 to calculate the second conversion value is not limited to the above.

As described above, conversion parameter calculator 110 of displacement measurement system 1 according to this variation further calculates a conversion value for converting a pixel displacement amount into an actual displacement amount, using displacement direction information indicating a displacement direction of object 60.

According to this, displacement measurement system 1 can calculate a conversion value using displacement direction information when object 60 is displaced in a direction crossing the image capturing surface of first image capturing device 10 in a top view of object 60, and thus can accurately measure the actual value of the displacement.

Embodiment 2

2-1. Configuration of Displacement Measurement System

Figure 9:
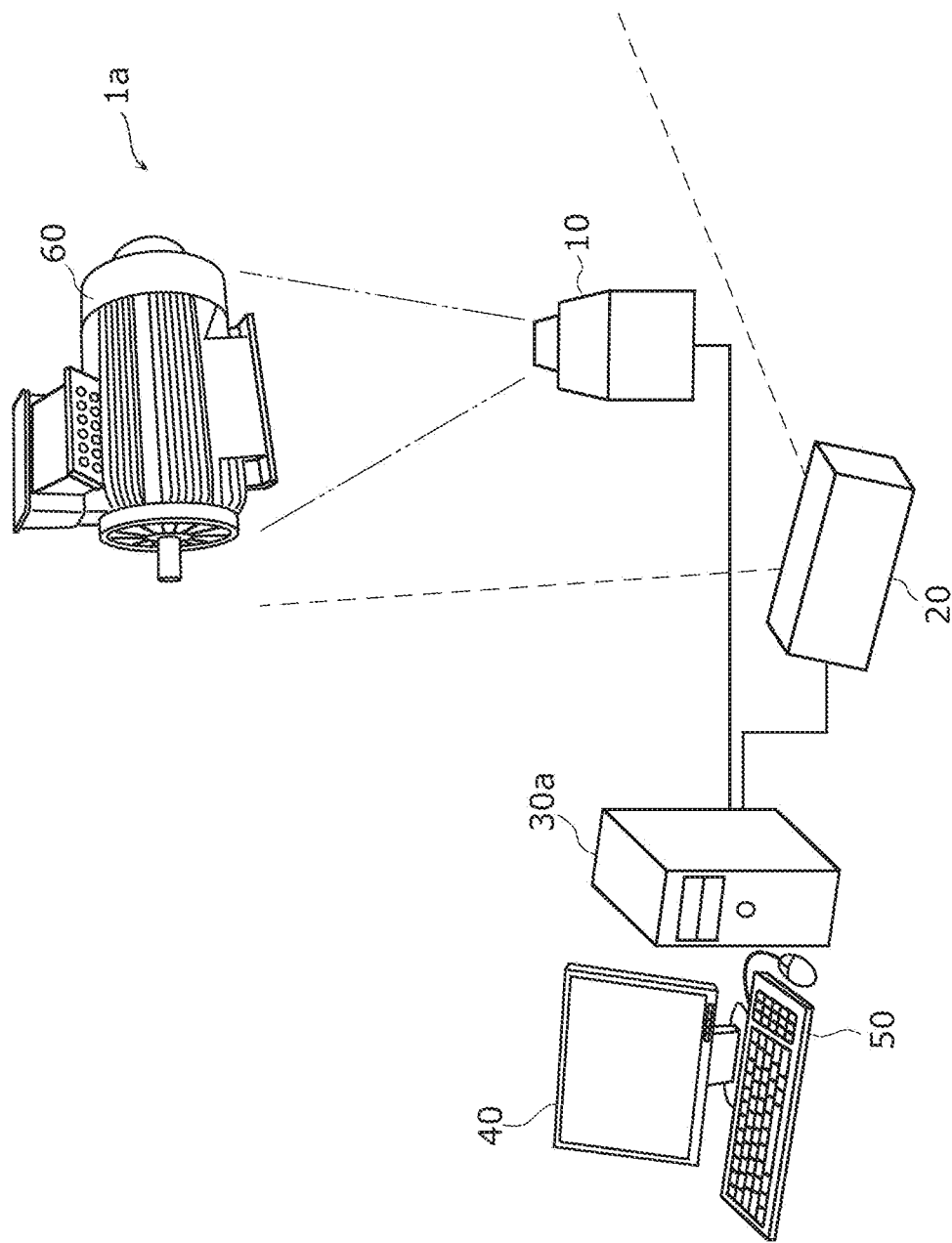
FIG. 9 illustrates a schematic configuration of a displacement measurement system according to Embodiment 2.
Figure 10:
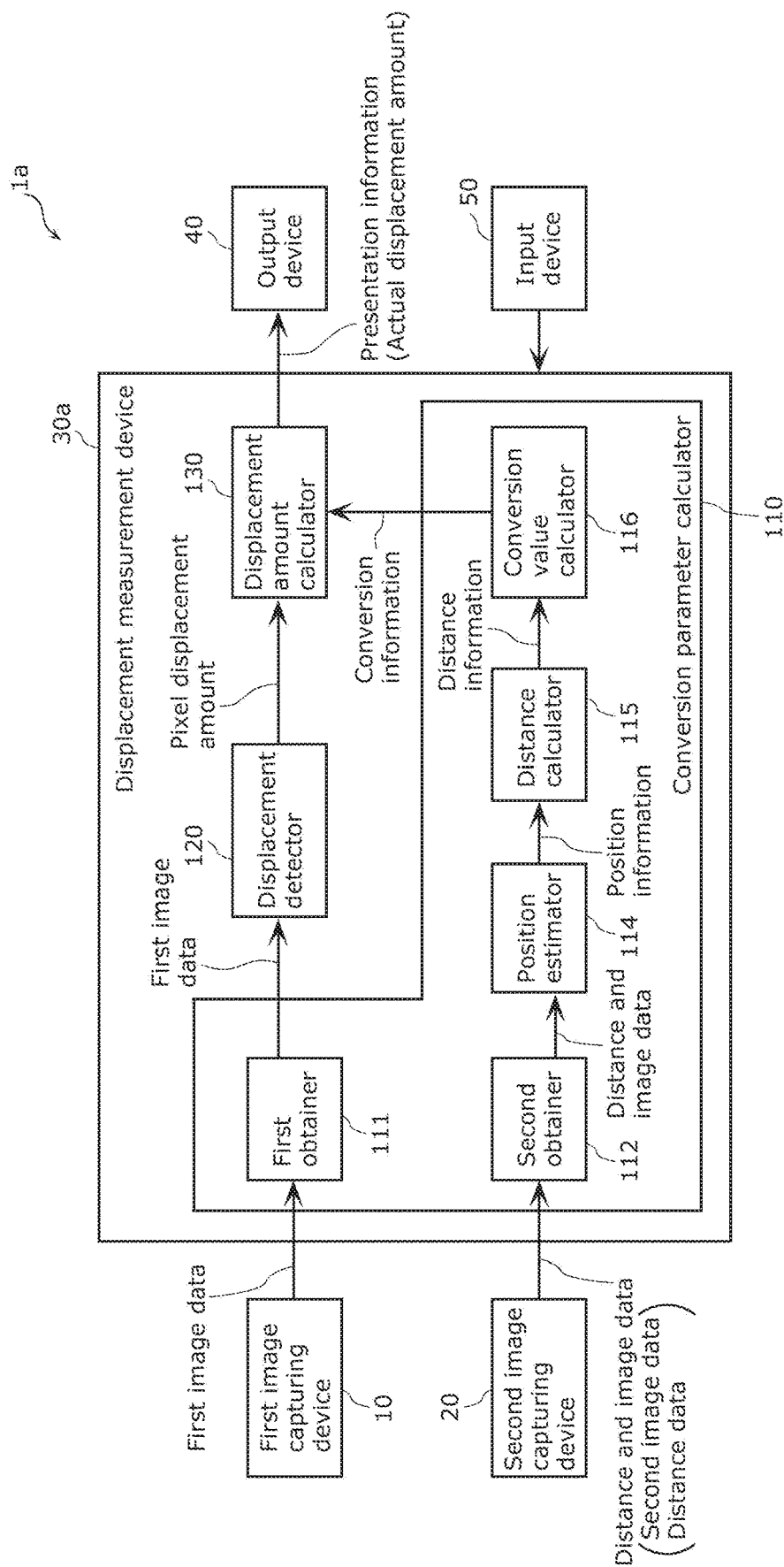
FIG. 10 is a block diagram illustrating a functional configuration of the displacement measurement system according to Embodiment 2.

A configuration of displacement measurement system 1a according to Embodiment 2 is to be described with reference to FIG. 9 to FIG. 11. FIG. 9 illustrates a schematic configuration of displacement measurement system 1a according to Embodiment 2. FIG. 10 is a block diagram illustrating a functional configuration of displacement measurement system 1a according to Embodiment 2. Displacement measurement device 30a according to Embodiment 2 differs from displacement measurement device 30 according to Embodiment 1 in that second obtainer 112 obtains, from second image capturing device 20, second image data that includes first image capturing device 10 and distance data, and position estimator 114 estimates position information of first image capturing device 10 using only the second image data and the distance data. Note that the following description focuses on differences from Embodiment 1, and the same signs are assigned to equivalent elements to those of Embodiment 1, so that a description thereof may be omitted or simplified.

As illustrated in FIG. 9, displacement measurement system 1a according to Embodiment 2 is an information processing system that measures an actual value of a displacement of object 60, using two image capturing devices disposed in different positions. First image capturing device 10 and second image capturing device 20 capture images of object 60 from different viewpoints.

As illustrated in FIG. 9 and FIG. 10, displacement measurement system 1a includes first image capturing device 10, second image capturing device 20, displacement measurement device 30a, output device 40, and input device 50.

Second image capturing device 20 captures an image that includes first image capturing device 10 and object 60. Second image capturing device 20 may capture an image that includes first image capturing device 10 in such a manner that the shape of first image capturing device 10 can be detected or if a marker is attached to the casing of first image capturing device 10, may capture an image that includes the marker. Second image capturing device 20 captures an image that includes at least one surface out of a plurality of surfaces that define first image capturing device 10, for example.

Second image capturing device 20 may capture an image in a position and/or an orientation in which first image capturing device 10 and object 60 do not overlap. Second image capturing device 20 may be disposed behind first image capturing device 10, for example.

Displacement measurement device 30a differs from displacement measurement device 30 according to Embodiment 1 in that matcher 113 is not included.

First obtainer 111 obtains first image data indicating a first image that includes object 60 from first image capturing device 10. First obtainer 111 outputs the obtained first image data to displacement detector 120.

Second obtainer 112 obtains second image data indicating a second image that includes first image capturing device 10 and object 60 and distance data from second image capturing device 20.

Position estimator 114 detects first image capturing device 10 from the distance data and/or the second image data. Since at least one of the appearance, the size, or the shape of first image capturing device 10 is known in advance, position estimator 114 may detect first image capturing device 10 by two-dimensional or three-dimensional pattern matching. Position estimator 114 may detect first image capturing device 10, based on at least one of the casing, the lens of first image capturing device 10, or a marker attached onto the casing of first image capturing device 10 as illustrated in FIG. 11, for instance.

Figure 11:
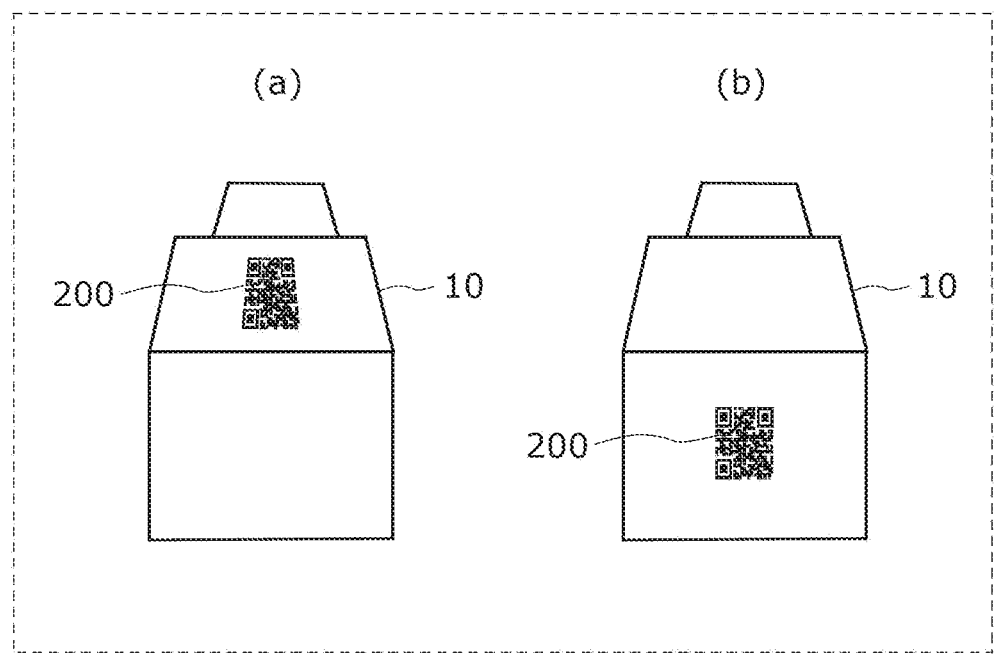
FIG. 11 illustrates examples of a marker applied to a first image capturing device according to Embodiment 2.

FIG. 11 illustrates examples of marker 200 applied to first image capturing device 10 according to Embodiment 2. Part (a) of FIG. 11 illustrates a state in which marker 200 is applied onto the top surface of first image capturing device 10. Part (b) of FIG. 11 illustrates a state in which marker 200 is applied onto the side surface of first image capturing device 10. At least one marker is applied to first image capturing device 10.

Position estimator 114 determines the three-dimensional position coordinates of the optical center, based on the detected position of first image capturing device 10. The position of the optical center of first image capturing device 10 relative to the casing thereof, for instance, can be determined based on the design value with respect to a combination of the second camera and the lens thereof, or can be obtained in advance by optical calibration. Position estimator 114 outputs, to distance calculator 115, position information that includes position coordinates of first image capturing device 10 when the obtained optical center is a reference (origin). Note that the rest of the configuration and the operation of displacement measurement system 1a are the same as those in Embodiment 1. Embodiment 2 has an advantage that position estimator 114 can estimate position information of first image capturing device 10 without being influenced by the position of a feature point or the number of feature points obtained from an image, since position estimator 114 estimates position information of first image capturing device 10 using only second image data and distance data.

2-2. Operation of Displacement Measurement System

Next, operation of displacement measurement system 1a is to be described with reference to FIG. 12. FIG. 12 is a flowchart illustrating operation of displacement measurement system 1a according to Embodiment 2. Specifically, FIG. 12 is a flowchart illustrating operation of displacement measurement device 30a.

As illustrated in FIG. 12, first obtainer 111 obtains first image data indicating a first image from first image capturing device 10 (S11). First obtainer 111 obtains first image data I1 as illustrated in (a) of FIG. 4, for example. Step S11 is an example of the obtaining of the first image data.

Next, second obtainer 112 obtains second image data indicating a second image and distance data indicating a distance from second image capturing device 20 (S31). Second obtainer 112 obtains second image data that includes both object 60 and first image capturing device 10, and distance data that indicates a distance, from second image capturing device 20. Second obtainer 112 outputs the second image data and the distance data obtained to position estimator 114. Step S31 is an example of the obtaining of the second distance data.

Position estimator 114 detects first image capturing device 10 from the distance data and/or the second image data. Position estimator 114 detects first image capturing device 10 in the second image data, from the distance data and/or the second image data, for example (S32). Position estimator 114 detects the shape of first image capturing device 10 in the second image data by the above method, for example.

Position estimator 114 estimates the three-dimensional position coordinates of the optical center, based on the detected position of first image capturing device 10. It can also be said that position estimator 114 estimates the position of first image capturing device 10 relative to the position of second image capturing device 20, based on the detected position of first image capturing device 10 (S33). In other words, position estimator 114 estimates the position of first image capturing device 10, without using correspondence information of two images. Position estimator 114 outputs, to distance calculator 115, position information that includes position coordinates of first image capturing device 10 when the obtained optical center is a reference (origin). Note that the position information includes distance data obtained by second obtainer 112.

The processing of step S15 and thereafter is the same as that in Embodiment 1, and thus a description thereof is omitted.

In this manner, according to displacement measurement system 1a, position estimator 114 estimates position information of first image capturing device 10 using second image data that includes first image capturing device 10 and distance data, and thus can estimate position information of first image capturing device 10 without being influenced by the position of a feature point or the number of feature points in two images.

Note that the present embodiment has described an example in which a physical quantity in the real space is the actual displacement amount, but the physical quantity is not limited thereto. The physical quantity in the real space is not limited in particular as long as the quantity can be obtained from image data, and may be a length or an area, for example. Further, the physical quantity in the real space may be the speed at which a displacement is made, for instance, based on the actual displacement amount between a plurality of frames. In this case, in the calculating of the conversion parameter (corresponding to S16), a conversion parameter for converting the physical quantity in pixels at a measurement point on object 60, based on at least two third image data items captured by first image capturing device 10 at different times into a physical quantity in the real space is calculated using first distance data. Further, in this case, displacement measurement device 30a described in the present embodiment can also be considered as a physical quantity measurement device.

For example, a conversion parameter calculation method for calculating a conversion parameter for measuring, using images, a physical quantity in a real space of an object may include: obtaining, from first image capturing device 10, first image data I1 obtained by first image capturing device 10 capturing an image of object 60 (corresponding to S11); obtaining, from second image capturing device 20, second distance data indicating a distance from second image capturing device 20 to the object, and second image data obtained by second image capturing device 20 capturing an image that includes object 60 and first image capturing device 10, second image capturing device 20 being disposed in a position different from a position of first image capturing device 10 (corresponding to S31); detecting a shape of first image capturing device 10 in the second image data (corresponding to S32); estimating the position of first image capturing device 10, based on a result of detecting the shape (corresponding to S33); calculating first distance data indicating a distance from first image capturing device 10 to object 60, based on the position of first image capturing device 10 and the second distance data (corresponding to S15); and calculating a conversion value (an example of the conversion parameter), using the first distance data, the conversion value being a value for converting, into an actual physical quantity in the real space, a pixel physical quantity at a measurement point on object 60 based on third image data captured by first image capturing device 10 (corresponding to S16).

For example, conversion parameter calculation device 110 that calculates a conversion parameter for measuring, using images, a physical quantity in a real space of an object may be acquired. For example, conversion parameter calculation device 110 may include: first obtainer 111 that obtains, from first image capturing device 10, first image data obtained by first image capturing device 10 capturing an image of object 60; second obtainer 112 that obtains, from second image capturing device 20, second distance data indicating a distance from second image capturing device 20 to object 60, and second image data obtained by second image capturing device 20 capturing an image that includes object 60 and first image capturing device 10, second image capturing device 20 being disposed in a position different from a position of first image capturing device 10; position estimator 114 that detects a shape of first image capturing device 10 in the second image data, and estimates the position of first image capturing device 10, based on a result of detecting the shape; distance calculator 115 that calculates first distance data indicating a distance from first image capturing device 10 to object 60, based on the position of first image capturing device 10 and the second distance data; and conversion value calculator 116 that calculates the conversion parameter, using the first distance data, the conversion parameter being a parameter for converting, into the actual physical quantity in the real space, a pixel physical quantity at a measurement point on object 60 based on third image data captured by first image capturing device 10.

Other Embodiments

The above has described the conversion parameter calculation method and others according to one or more aspects of the present disclosure, based on Embodiment 1, Embodiment 2, and the variation (hereinafter, also referred to as the embodiments and others), yet the present disclosure is not limited to the embodiments and others. The scope of the one or more aspects of the present disclosure may also encompass embodiments resulting from applying various modifications that those skilled in the art could think of to the embodiments and others, and embodiments resulting from combining elements in different embodiments, as long as the resultant embodiments do not depart from the scope of the present disclosure.

For example, the embodiments and others have described examples in which the first image capturing device and the second image capturing device are image capturing devices fixed on the ground, yet the image capturing devices are not limited thereto. At least one of the first image capturing device or the second image capturing device may be provided in an aircraft such as a drone, for example.

The embodiments and others have described examples in which the first obtainer and the second obtainer are communicators, but the obtainers are not limited thereto. At least one of the first obtainer or the second obtainer may be, for example, a connector to which a recording medium is connected. For example, a connector may be a universal serial bus (USB) port to which a USB terminal is connected, a security digital (SD) slot into which an SD card is inserted, or an optical drive into which an optical disc is inserted, for instance.

The order in which the steps in the flowcharts are executed is an example used to specifically explain the present disclosure, and thus may be a different order from the above. In addition, some of the steps may be executed simultaneously (in parallel) with other steps.

Split of functional blocks in the block diagrams is an example, and thus a plurality of functional blocks may be acquired as a single functional block, a single functional block may be split into a plurality of blocks, or some functions may be transferred to another functional block. Single hardware or software may process similar functions of a plurality of functional blocks, in parallel or by time division.

The conversion parameter calculation device according to the embodiments and others may be acquired as a single device or by a plurality of devices connected to one another. If a conversion parameter calculation device is acquired by a plurality of devices, elements included in the conversion parameter calculation device may be divided into the plurality of devices in any manner.

The embodiments and others have described examples in which the displacement measurement device does not include the output device, or in other words, the displacement measurement device and the output device are separately provided, yet the displacement measurement device may include the output device. In this case, the output device functions as an outputter (for example, a display) that is a part of the displacement measurement device.

Further, the method for communication between devices included in the displacement measurement systems according to the embodiments and others are not particularly limited. The devices may communicate with one another in a wireless or wired manner. The devices may communicate with one another in both wireless and wired manners.

Further, some or all of the elements included in the calculation devices according to the embodiments and others may be configured by a single system large scale integration (LSI).

The system LSI is a super multi-function LSI that is manufactured by integrating a plurality of processors in one chip, and is specifically a computer system configured so as to include a microprocessor, a read only memory (ROM), and a random access memory (RAM), for instance. A computer program is stored in the RAM. The system LSI accomplishes its functions through the operation of the microprocessor in accordance with the computer program.

Noted that although a system LSI is mentioned here, the integrated circuit can also be called an IC, an LSI, a super LSI, or an ultra LSI, depending on the difference in the degree of integration. Furthermore, the method of circuit integration is not limited to LSIs, and implementation through a dedicated circuit or a general-purpose processor is also possible. A field programmable gate array (FPGA) that allows programming after LSI manufacturing or a reconfigurable processor that allows reconfiguration of the connections and settings of the circuit cells inside the LSI may also be used.

In addition, depending on the emergence of circuit integration technology that replaces LSI due to progress in semiconductor technology or other derivative technology, such technology of course may be used to integrate the functional blocks. Possibilities in this regard include the application of biotechnology, for instance.

All or some of the various processes described above may be performed by hardware such as an electronic circuit or software. Note that the processing by the software is implemented by the processor included in the displacement measurement device executing a program stored in the memory.

An aspect of the present disclosure may be a computer program that causes a computer to execute distinctive steps included in the conversion parameter calculation method. Further, an aspect of the present disclosure may be a non-transitory computer-readable storage medium that stores therein such a program. For example, such a program may be stored in a recording medium, and the recording medium may be distributed. For example, by installing the distributed program in a device that includes another processor and causing the processor to execute the program, the device can be caused to perform the above processing.

INDUSTRIAL APPLICABILITY

The present disclosure is widely applicable to a device, for instance, that measures an actual value of a displacement in measuring a displacement of an object using images.

The invention claimed is:

1. A conversion parameter calculation method for calculating a conversion parameter for measuring, using images, an actual displacement amount that is an actual value of a displacement indicating movement of an object, the conversion parameter calculation method comprising:
   obtaining first image data obtained by a first camera capturing an image of the object;
   obtaining second distance data indicating a distance from a second camera to the object, and second image data obtained by the second camera capturing an image of the object, the second camera being disposed in a position different from a position of the first camera, the second distance data being measured by a depth sensor;
   obtaining displacement direction information indicating a direction of the displacement of the object in three dimensions;
   associating a position on the object in the first image data with a position on the object in the second image data;
   estimating the position of the first camera relative to the position of the second camera, based on the second distance data and a result of associating the positions;
   calculating first distance data indicating a distance from the first camera to the object, based on the position of the first camera and the second distance data; and
   calculating the conversion parameter, using the first distance data and the displacement direction information, the conversion parameter being a parameter for converting, into the actual displacement amount, a pixel displacement amount at a measurement point on the object based on at least two third image data items captured by the first camera at different times,
   wherein the first camera has a resolution and a frame rate at least one of which is higher than a resolution and a frame rate of the second camera.

2. The conversion parameter calculation method according to claim 1,
   wherein the object has at least two measurement points for measuring the displacement, the at least two measurement points including the measurement point,
   the calculating of the first distance data includes calculating the first distance data indicating a distance from each of the at least two measurement points to the first camera, to obtain at least two first distance data items, and
   the calculating of the conversion parameter, using the first distance data and the displacement direction information, includes calculating, for each of the at least two measurement points, a conversion value for the measurement point as the conversion parameter, based on one of the at least two first distance data items indicating the distance from the measurement point.

3. The conversion parameter calculation method according to claim 2,
   wherein the calculating of the first distance data includes calculating, for each of surface points on the object, the first distance data from the surface point to the first camera to obtain first distance data items, the surface points including the at least two measurement points, and
   the calculating of the conversion parameter, using the first distance data and the displacement direction information, includes:
      calculating, for each of the surface points, a conversion value for the surface point, based on one of the first distance data items indicating the distance from the surface point, to calculate conversion values; and
      generating a conversion value map as the conversion parameter, based on the conversion values calculated.

4. The conversion parameter calculation method according to claim 1,
   wherein the displacement direction information is obtained via an input device.

5. The conversion parameter calculation method according to claim 1,
wherein the object has object displacement information indicating information on the direction of the displacement of the object, and
the displacement direction information is obtained based on the first image data, the first image data being obtained by the first camera capturing an image of the object having the object displacement information.

6. A displacement amount calculation method comprising:
obtaining the conversion parameter calculated using the conversion parameter calculation method according to claim 1;
obtaining the at least two third image data items; and
converting, based on the conversion parameter, the pixel displacement amount between the at least two third image data items into the actual displacement amount.

7. A conversion parameter calculation method for calculating a conversion parameter for measuring, using images, an actual displacement amount that is an actual value of a displacement indicating movement of an object, the conversion parameter calculation method comprising:
obtaining first image data obtained by a first camera capturing an image of the object;
obtaining second distance data indicating a distance from a second camera to the object,
and second image data obtained by the second camera capturing an image that includes the object and the first camera, the second camera being disposed in a position different from a position of the first camera, the second distance data being measured by a depth sensor;
obtaining displacement direction information indicating a direction of the displacement of the object in three dimensions;
detecting a shape of the first camera in the second image data;
estimating the position of the first camera, based on a result of detecting the shape;
calculating first distance data indicating a distance from the first camera to the object,
based on the position of the first camera and the second distance data; and
calculating the conversion parameter, using the first distance data and the displacement direction information, the conversion parameter being a parameter for converting, into the actual displacement amount, a pixel displacement amount at a measurement point on the object based on at least two third image data items captured by the first camera at different times,
wherein the first camera has a resolution and a frame rate at least one of which is higher than a resolution and a frame rate of the second camera.

8. A conversion parameter calculation method for calculating a conversion parameter for measuring, using images, an actual displacement amount that is an actual value of a displacement indicating movement of an object, the conversion parameter calculation method comprising:
obtaining first image data obtained by a first camera capturing an image of the object;
obtaining second distance data indicating a distance from a second camera to the object, and second image data obtained by the second camera capturing an image that includes the object and the first camera, the second camera being disposed in a position different from a position of the first camera, the second distance data being measured by a depth sensor;
obtaining displacement direction information indicating a direction of the displacement of the object in three dimensions;
detecting a shape of the first camera in the second image data;
estimating the position and an orientation of the first camera, based on a result of detecting the shape;
calculating first distance data indicating a distance from the first camera to the object, based on the position and the orientation of the first camera and the second distance data; and
calculating the conversion parameter, using the first distance data and the displacement direction information, the conversion parameter being a parameter for converting, into the actual displacement amount, a pixel displacement amount at a measurement point on the object based on at least two third image data items captured by the first camera at different times,
wherein the first camera has a resolution and a frame rate at least one of which is higher than a resolution and a frame rate of the second camera.

9. A conversion parameter calculation device that calculates a conversion parameter for measuring, using images, an actual displacement amount that is an actual value of a displacement indicating movement of an object, the conversion parameter calculation device comprising:
a memory; and
a processor;
wherein the processor executes instructions stored on the memory so as to:
obtain first image data obtained by a first camera capturing an image of the object;
obtain second distance data indicating a distance from a second camera to the object, and second image data obtained by the second camera capturing an image of the object, the second camera being disposed in a position different from a position of the first camera, the second distance data being measured by a depth sensor;
obtain displacement direction information indicating a direction of the displacement of the object in three dimensions;
associate a position on the object in the first image data with a position on the object in the second image data;
estimate the position of the first camera relative to the position of the second camera, based on the second distance data and a result of associating the positions;
calculate first distance data indicating a distance from the first camera to the object, based on the position of the first camera and the second distance data; and
calculate the conversion parameter, using the first distance data and the displacement direction information, the conversion parameter being a parameter for converting, into the actual displacement amount, a pixel displacement amount at a measurement point on the object based on at least two third image data items captured by the first camera at different times,
wherein the first camera has a resolution and a frame rate at least one of which is higher than a resolution and a frame rate of the second camera.

10. A displacement amount calculation device comprising:
a memory; and
a processor;
wherein the processor executes instructions stored on the memory so as to:

obtain the conversion parameter calculated using the conversion parameter calculation device according to claim 9;

obtain the at least two third image data items; and convert, based on the conversion parameter, the pixel displacement amount between the at least two third image data items into the actual displacement amount.

11. A conversion parameter calculation device that calculates a conversion parameter for measuring, using images, an actual displacement amount that is an actual value of a displacement indicating movement of an object, the conversion parameter calculation device comprising:

a memory; and a processor;

wherein the processor executes instructions stored on the memory so as to:

obtain first image data obtained by a first camera capturing an image of the object;

obtain second distance data indicating a distance from a second camera to the object, and second image data obtained by the second camera capturing an image that includes the object and the first camera, the second camera being disposed in a position different from a position of the first camera, the second distance data being measured by a depth sensor;

obtain displacement direction information indicating a direction of the displacement of the object in three dimensions;

detect a shape of the first camera in the second image data, and estimate the position of the first camera, based on a result of detecting the shape;

calculate first distance data indicating a distance from the first camera to the object, based on the position of the first camera and the second distance data; and calculate the conversion parameter, using the first distance data and the displacement direction information, the conversion parameter being a parameter for converting, into the actual displacement amount, a pixel displacement amount at a measurement point on the object based on at least two third image data items captured by the first camera at different times, wherein the first camera has a resolution and a frame rate at least one of which is higher than a resolution and a frame rate of the second camera.

* * * * *